(12) United States Patent
Kuroda et al.

(10) Patent No.: US 7,038,723 B1
(45) Date of Patent: May 2, 2006

(54) SOLID STATE IMAGING DEVICE, METHOD FOR DRIVING THE SAME AND CAMERA USING THE SAME

(75) Inventors: Takao Kuroda, Osaka (JP); Sei Suzuki, Osaka (JP); Akito Kidera, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/558,888

(22) Filed: Apr. 26, 2000

(30) Foreign Application Priority Data

Apr. 26, 1999 (JP) .................................. 11-117853

(51) Int. Cl.
*H04N 3/14* (2006.01)

(52) U.S. Cl. ...................................... 348/312; 348/322

(58) Field of Classification Search ................ 257/239, 257/E29.231, 241, E29.138, 222, 232, 250; 377/62, 60; 348/311, 312, 294, 296, 298
See application file for complete search history.

(56) References Cited

U.S. PATENT DOCUMENTS

| | | | | |
|---|---|---|---|---|
| 4,468,684 A | * | 8/1984 | Esser et al. .................. 257/222 |
| 4,680,637 A | * | 7/1987 | Sugiki ......................... 348/311 |
| 4,697,200 A | * | 9/1987 | Miyatake .................... 427/316 |
| 4,774,586 A | * | 9/1988 | Koike et al. ................ 348/323 |
| 4,963,983 A | * | 10/1990 | Kohno et al. ............... 348/314 |
| 5,044,000 A | * | 8/1991 | Iijima .......................... 377/60 |
| 5,051,832 A | * | 9/1991 | Losee et al. ............. 348/220.1 |
| 5,393,997 A | * | 2/1995 | Fukusho et al. ............ 257/232 |
| 5,432,308 A | * | 7/1995 | West et al. ............... 250/208.2 |
| 5,483,091 A | * | 1/1996 | West et al. .................. 257/239 |
| 5,528,291 A | * | 6/1996 | Oda ......................... 348/220.1 |
| 5,784,103 A | * | 7/1998 | Pine et al. .................. 348/312 |
| 5,828,407 A | * | 10/1998 | Suzuki ........................ 348/312 |
| 5,933,188 A | * | 8/1999 | Shinohara et al. .......... 348/302 |
| 5,990,952 A | * | 11/1999 | Hamasaki .................... 348/311 |
| 6,075,565 A | * | 6/2000 | Tanaka et al. .............. 348/312 |
| 6,222,586 B1 | * | 4/2001 | Nagakawa .................. 348/311 |
| 6,380,977 B1 | * | 4/2002 | Ogawa ........................ 348/311 |
| 6,452,243 B1 | * | 9/2002 | Hatano et al. .............. 257/448 |
| 6,515,703 B1 | * | 2/2003 | Suzuki et al. ............... 348/317 |
| 6,525,770 B1 | * | 2/2003 | Ueda et al. ................. 348/316 |

(Continued)

FOREIGN PATENT DOCUMENTS

JP          63-136777          6/1988

(Continued)

*Primary Examiner*—Ngoc-Yen Vu
*Assistant Examiner*—Timothy J. Henn
(74) *Attorney, Agent, or Firm*—Hamre, Schumann, Mueller & Larson, P.C.

(57) ABSTRACT

In making solid state imaging devices smaller and increasing their number of pixels, it is desirable to increase the charge amount that can be handled per unit area of the transfer portions. It is possible to achieve this by making the insulating film thinner, but this leads to electric fields in the semiconductor substrate that are too strong, and causes problems such as the generation of noise and the deterioration of the transfer efficiency. This invention relaxes potential steps in the transfer region by applying, when a signal charge 1 is being read out ($t=t_2$), a high voltage to the electrode 43 for reading out the signal charge, a low voltage to at least one of the electrodes 41, 45–47 for preventing unnecessary mixing of signal charges, and an intermediate voltage between the high voltage and the low voltage to the electrodes 42 and 44, which are adjacent to the electrode 43 to which the high voltage is applied.

28 Claims, 34 Drawing Sheets

U.S. PATENT DOCUMENTS 6,674,469 B1 * 1/2004 Watanabe .................. 348/296

FOREIGN PATENT DOCUMENTS

| JP | 63-234677 | 9/1988 |
| JP | 2-63277 | 3/1990 |
| JP | 3-101484 | 4/1991 |
| JP | 5-316429 | 11/1993 |
| JP | 06275810 A * | 9/1994 |
| JP | 7-322143 | 12/1995 |
| JP | 07322143 A * | 12/1995 |
| JP | 9-326481 | 12/1997 |
| JP | 10-84506 | 3/1998 |

* cited by examiner

Field A

Field B

Field A

Field A

Field A

SOLID STATE IMAGING DEVICE, METHOD FOR DRIVING THE SAME AND CAMERA USING THE SAME

BACKGROUND OF THE INVENTION

1. Field of the Invention

The present invention relates to a method for driving a solid state imaging device. More particularly, the present invention relates to a method for driving a solid state imaging device using a charge coupled device (CCD), a solid state imaging device having a structure for performing this method, and a camera using this solid state imaging device.

2. Description of the Prior Art

The driving of solid state imaging devices using CCDs lets the solid state imaging device read out signal charges, generated by a photodiode's ability to convert photons into electrons, from the photodiode into a vertical transfer region, transfer the signal charges in the vertical transfer region (this is called "vertical transfer" in the following), and then transfer them in a horizontal transfer region (this is called "horizontal transfer" in the following).

The following is an explanation of a conventional driving method, referring to the accompanying drawings. First of all, the solid state imaging device referred to in the explanations of this conventional driving method is explained with FIG. 31 and FIG. 32, which is a partial cross-section taken along V—V in FIG. 31. This solid state imaging device includes two vertical transfer electrodes 171 for each photodiode (light-receiving portion) 110 (for example, the two electrodes 122 and 123 are both associated with the same photodiode). The electrodes 121, 122, . . . , 127, . . . are connected to wires, so that during the vertical transfer of the signal charges, one of the voltage patterns $\phi V_{101}$–$\phi V_{104}$ is applied to them. Depending on these predetermined voltage patterns applied through an insulating film 118 formed on the substrate, signal charges are transferred in the vertical transfer region 117 formed in a p-well 116 of an n-type silicon substrate 115. Then, the signal charges are transferred in the horizontal transfer region 112, until they reach an output amplifier 113.

FIG. 33 shows conventional voltage patterns applied to the vertical transfer electrodes 171 in the solid state imaging device shown in the drawings. The voltage patterns $\phi V_{101}$–$\phi V_{104}$ are achieved by holding voltages selected from a high voltage $V_H$, a medium voltage $V_M$ and a low voltage $V_L$ for certain periods of time (in the drawings, these voltages are denoted by the letters "H", "M" and "L"; the same holds true for the following). By applying these voltage patterns to the vertical transfer electrodes 171, the potential in the vertical transfer region changes as shown in FIG. 34.

Referring to FIG. 34, the following is an explanation of the transfer of the signal charges brought about by this change of potential. First of all, at the time $t_2$, the voltage pattern $\phi V_{101}$ applies a high voltage $V_H$ to the electrodes 123 and 127, and due to the resulting potential increase in the vertical transfer regions below the electrodes 123 and 127, signal charges 101 that have accumulated in the photodiodes 110 are read out. At the time $t_2$, the signal charges 101 are read out from every other photodiode, with respect to the vertical transfer direction. On the other hand, the signal charges 102 accumulated in the remaining photodiodes are read out at the time $t_5$. The signal charges 101 and 102 are mixed at the time $t_7$, and transferred in the vertical transfer region as a signal charge 103 corresponding to two photodiodes. As is shown in FIG. 34, the signal charge read out by the electrode 123 is mixed with the signal charge read out by the electrode 121.

The vertical transfer of charges represents a first field (Field A), and subsequently a second field (Field B) is performed. While it is not shown in the drawings, another combination different from the Field A is used for the mixing of the signal charges 101 and 102 in the Field B. Thus, in the Field B, the signal charge read out with the voltage applied to the electrode 123 is mixed at the time $t_7$ with the signal charge on the opposite side, read out with the voltage applied to the electrode 125.

However, in the course of making the solid state imaging device smaller and increasing the number of pixels, to sustain its so-called saturation characteristics, it is desirable to increase the charge amount that can be handled per unit area in the vertical transfer region. As becomes clear from FIG. 32, to increase the signal charge that can be handled in the vertical transfer region 117, it is advantageous if the thickness of the insulating film (gate insulating film) 118 used as the dielectric is thin, which is analogous to trying to increase the capacity of a capacitor.

However, when the thickness of the insulating film is reduced, then noise increases in the solid state imaging device, and the transfer efficiency of the signal charges deteriorates. This may lead to an avalanche breakdown of the silicon. That is to say, as the insulating film becomes thinner, the electric fields in the substrate increase, which ultimately leads to electric fields large enough to cause avalanche breakdown of the silicon. A part of the charge generated by such an avalanche breakdown is an unnecessary charge including noise (causing noise in the form of white marks on the image). Another portion of the generated charge is knocked into the insulating film and creates an uneven potential in the vertical transfer region, lowering the transfer efficiency of the signal charge.

Furthermore, to reduce the consumed energy of the solid state imaging device, it is desirable to drive the device at low voltages, so that the peak potential of the read-out voltage pulses should be low. However, simply lowering the read-out voltage may lead to read-out residues of the signal charges. In particular, with a device, in which the photodiodes are formed in a p-type layer formed in an n-type substrate, a higher read-out voltage is necessary, because of the potential variations in the p-type layer caused by the electrical resistance of the p-type layer.

SUMMARY OF THE INVENTION

It is an object of the present invention to provide a method for driving a solid state imaging device that has been made smaller and which has an increased number of pixels, wherein the noise in the form of white marks can be reduced and deterioration of the transfer efficiency of the signal charges can be prevented, even with a thinner insulating film. It is another object of the present invention to provide a method for driving a solid state imaging device, wherein the peak potential of the read-out voltage pulse can be lowered. It is a further object of the present invention to provide a solid state imaging device having a structure that is appropriate for such a driving method, and a camera using this solid state imaging device.

To achieve these objects, the inventors of the present invention focused on the fact that in conventional driving methods, a low voltage is applied to the electrodes adjacent to those electrodes to which a high voltage is applied for reading out the signal charges, so as to prevent unnecessary mixing of the signal charges. Not being limited to the above examples of driving methods, conventionally, electrodes to which a high voltage is applied are adjacent to electrodes to which a low voltage is applied when the signal charges are being read out. However, with such a driving method, a large voltage difference occurs across a very narrow space (for example, a space of less than 70 nm may be present between the electrodes) between adjacent electrodes, and large electric fields of orders that may lead to avalanche breakdown of the silicon occur easily. To avoid this, a first aspect of the present invention introduces a driving method that relaxes this voltage difference.

A first method of the present invention for driving a solid state imaging device comprising a plurality of light-receiving portions formed in a semiconductor substrate, a transfer region formed alongside a column of said light-receiving portions in said semiconductor substrate, and transfer electrodes made of a plurality of electrodes arranged on said transfer region, includes reading out signal charges accumulated in said light-receiving portions from said light-receiving portions to said transfer region; and transferring the signal charges in the transfer region while applying voltage to said plurality of electrodes; and at a time when the signal charges are being read out to said transfer region, applying a read-out voltage $V_H$ to the electrodes corresponding to those light-receiving portions that include signal charges to be read out;

applying a barrier voltage $V_L$ that is lower than the read-out voltage $V_H$ to at least one of said electrodes, which is located between the electrodes to which the read-out voltage $V_H$ is being applied and which is not adjacent to the electrodes to which the read-out voltage $V_H$ is being applied; and applying an intermediate voltage $V_M$ that is lower than the read-out voltage $V_H$ and higher than the barrier voltage $V_L$ to those electrodes that are adjacent to the electrodes to which the read-out voltage $V_H$ is being applied.

With the first driving method of the present invention, an intermediate voltage $V_M$ that is higher than the barrier voltage $V_L$ is applied to those electrodes that are adjacent to the electrodes to which the read-out voltage $V_H$ (that is, a high voltage) is being applied when signal charges are being read out, so that the voltage difference between adjacent electrodes can be relaxed.

Throughout this specification "low" and "high" voltage does not necessarily refer to an absolute value, but is used to indicate a relative potential.

Furthermore, to achieve the aforementioned objects, the inventors of the present invention focused on the fact that if a voltage is applied to electrodes to which the read-out voltage $V_H$ is not applied, then the potential of the impurity layer of the light-receiving portions can be shifted temporarily.

That is to say, a second method of the present invention for driving a solid state imaging device comprising a plurality of light-receiving portions formed in a semiconductor substrate, a transfer region formed alongside a column of said light-receiving portions in said semiconductor substrate, and transfer electrodes made of a plurality of electrodes arranged on said transfer region, the method includes reading out signal charges accumulated in said light-receiving portions from said light-receiving portions to said transfer region; and transferring the signal charges in the transfer region while applying voltage to said plurality of electrodes; and at a time when the signal charges are being read out to said transfer region, and lasting for a period starting at a predetermined period of time before the begin of an application of a read-out voltage $V_H$ to the electrodes corresponding to those light-receiving portions that include signal charges to be read out and ending when the application of a read-out voltage $V_H$ is terminated, applying to those electrodes corresponding to the light-receiving portions that are adjacent to those light-receiving portions that include signal charges to be read out, a voltage change that is opposite to a voltage change occurring when the read-out voltage $V_H$ is applied.

Furthermore, a first method of the present invention for driving a solid state imaging device comprising a plurality of light-receiving portions formed in a semiconductor substrate, a transfer region formed alongside a column of said light-receiving portions in said semiconductor substrate, and transfer electrodes made of a plurality of electrodes arranged on said transfer region, the method comprising reading out signal charges accumulated in said light-receiving portions from said light-receiving portions to said transfer region; and transferring the signal charges in the transfer region while applying voltage to said plurality of electrodes; and at a time when the signal charges are being read out to said transfer region, and lasting for a period starting at a predetermined period of time before the begin of an application of a read-out voltage $V_H$ to the electrodes corresponding to those light-receiving portions that include signal charges to be read out and ending when the application of a read-out voltage $V_H$ is terminated, applying, to those electrodes to which the read-out voltage $V_H$ is not applied and which are not adjacent to the electrodes to which the read-out voltage $V_H$ is applied, a voltage change that is opposite to a voltage change occurring when the read-out voltage $V_H$ is applied.

With this second and third driving methods, the potential of the impurity layer in the light-receiving portions temporarily can be shifted opposite to the potential that is applied by the read-out voltage, when the signal charges are being read out. Therefore, the voltage for reading out the signal charges becomes lower, without causing read-out residues.

In particular with the second driving method, voltage drops of the read-out electrodes to which the read-out voltage is applied, caused by capacitive coupling between the electrodes, can be curbed. That is to say, electrodes corresponding to the same light-receiving portions are capacitively coupled through these light-receiving portions, but with the above-described second driving method, an opposite voltage change is applied to the electrodes that do not correspond to the same light-receiving portions, so that voltage drops hardly occur in the electrodes to which the read-out voltage due to this capacitive coupling is applied.

Moreover, with the third driving method, the voltage difference between adjacent electrodes is relaxed, so that the opposite voltage change is applied to the electrodes that are not adjacent to electrodes to which the read-out voltage $V_H$ is applied.

Using the driving methods of the present invention, it is preferable to ensure that the number of gates of the solid state imaging device (that is, the number of transfer electrodes that correspond to one light-receiving portion) is suitable for the transfer of the signal charges that have been read out.

For example, when a so-called two-gate solid state imaging device is used (as shown in FIG. 31, this is a solid state imaging device in which a plurality of light-receiving portions are arranged in rows and columns, the transfer region is composed of vertical transfer regions, a horizontal transfer region is connected to the end of the vertical transfer regions, and two of the vertical transfer electrodes correspond to each light-receiving portion), then it is preferable that signal charges are read out separately with one of the aforementioned methods from a first group of light-receiving portions and a second group of light-receiving portions, the first and second group of, light-receiving portions are arranged alternately alongside each of the vertical transfer regions; and for the transfer of the signal charges, the method further includes driving a first field, including transferring a first signal charge read out from those light-receiving portions that belong to the first group of light-receiving portions to the vertical transfer regions below the electrodes corresponding to those light-receiving portions that belong to the second group of light-receiving portions; reading out a second signal charge from those light-receiving portions that belong to the second group of light-receiving portions and mixing it with the first signal charge; and transferring the mixed signal charges in the vertical transfer regions to the horizontal transfer region; and driving a second field, including transferring a second signal charge read out from those light-receiving portions that belong to the second group of light-receiving portions to the vertical transfer regions below the electrodes corresponding to those light-receiving portions that belong to the first group of light-receiving portions; reading out a first signal charge from those light-receiving portions that belong to the first group of light-receiving portions and mixing it with the second signal charge; and transferring the mixed signal charges in the vertical transfer regions to the horizontal transfer region.

In another preferable method when using such a two-gate solid state imaging device, the signal charges are read out separately with one of the aforementioned methods from a first group of light-receiving portions and a second group of light-receiving portions, the first and second group of light-receiving portions are arranged alternately alongside each of the vertical transfer regions; and the method further includes driving a first field, including transferring a first signal charge read out from those light-receiving portions that belong to the first group of light-receiving portions in the vertical transfer regions to the horizontal transfer region; and driving a second field, including transferring a second signal charge read out from those light-receiving portions that belong to the second group of light-receiving portions in the vertical transfer regions to the horizontal transfer region;

whereby the first signal charge and the second signal charge are transferred separately to the horizontal transfer region.

With this method, the first signal charge and the second signal charge can be transferred separately to the horizontal transfer region.

In this method, it is preferable to perform driving of the first field and the second field alternately.

When a so-called three-gate solid state imaging device is used (that is, a solid state imaging device in which three of the transfer electrodes correspond to each of the light-receiving portions), it is also possible to apply one of the above-noted methods for a two-gate solid state imaging device, but the following method can be used as well.

In this method, the signal charges are read out separately with one of the aforementioned methods from a first group of light-receiving portions and a second group of light-receiving portions, and the first and second group of light-receiving portions are arranged alternately alongside each of the vertical transfer regions; and the method further includes reading out a first signal charge from the light-receiving portions belonging to the first group of light-receiving portions; and reading out a second signal charge from the light-receiving portions belonging to the second group of light-receiving portions while applying a barrier voltage $V_L$ to the outer two of the three electrodes corresponding to the light-receiving portions belonging to the first group of light-receiving portions and applying an intermediate voltage $V_M$ to those middle electrodes located between the outer two electrodes so as to hold the first signal charge in the vertical transfer regions below the middle electrodes.

When a solid state imaging device with four gates or more is used (that is, a solid state imaging device in which four or more of the transfer electrodes correspond to each of the light-receiving portions), it is preferable to apply a method in which the signal charges are read out simultaneously from the light-receiving portions arranged alongside the transfer region.

With these methods for driving solid state imaging devices with three or four or more gates, it becomes possible to transfer signal charges that have been read out in the transfer region without mixing them with each other.

The invention also provides a solid state imaging device suitable for the above driving method for a three-gate solid state imaging device. This solid state imaging device includes a plurality of light-receiving portions formed in a semiconductor substrate; a transfer region formed in the semiconductor substrate alongside a column of the light-receiving portions; transfer electrodes arranged on the transfer region so that there are three of the transfer electrodes corresponding to each of the light-receiving portions; and at least two sets of wires for separately connecting a first group of electrodes corresponding to a first group of light-receiving portions and a second group of electrodes corresponding to a second group of light-receiving portions, the first and second group of light-receiving portions being arranged alternately alongside each of the vertical transfer regions.

With this solid state imaging device, the voltage difference between adjacent electrodes when the signal charges are being read out can be relaxed, the signal charges read out from the first and the second group of light-receiving portions can be transferred independently without mixing, using three-layer transfer electrodes.

A camera in accordance with the present invention includes a controller for applying a voltage pattern from a power source to the transfer electrodes, so as to carry out one of the driving methods of the present invention; and a solid state imaging device including a plurality of light-receiving portions formed in a semiconductor substrate, a transfer region formed alongside a column of the light-receiving portions in the semiconductor substrate, and transfer electrodes arranged on the transfer region.

In this camera, it is preferable that the solid state imaging device further includes an insulating film formed between the transfer region and the transfer electrodes, and the thickness of the insulating film when converted into a silicon oxide film so as to keep an equivalent dielectric effect in the film thickness direction is not more than 100 nm.

DESCRIPTION OF THE PREFERRED EMBODIMENTS

The following is a description of the preferred embodiments of the present invention, with reference to the accompanying drawings.

First Embodiment

Figure 1:
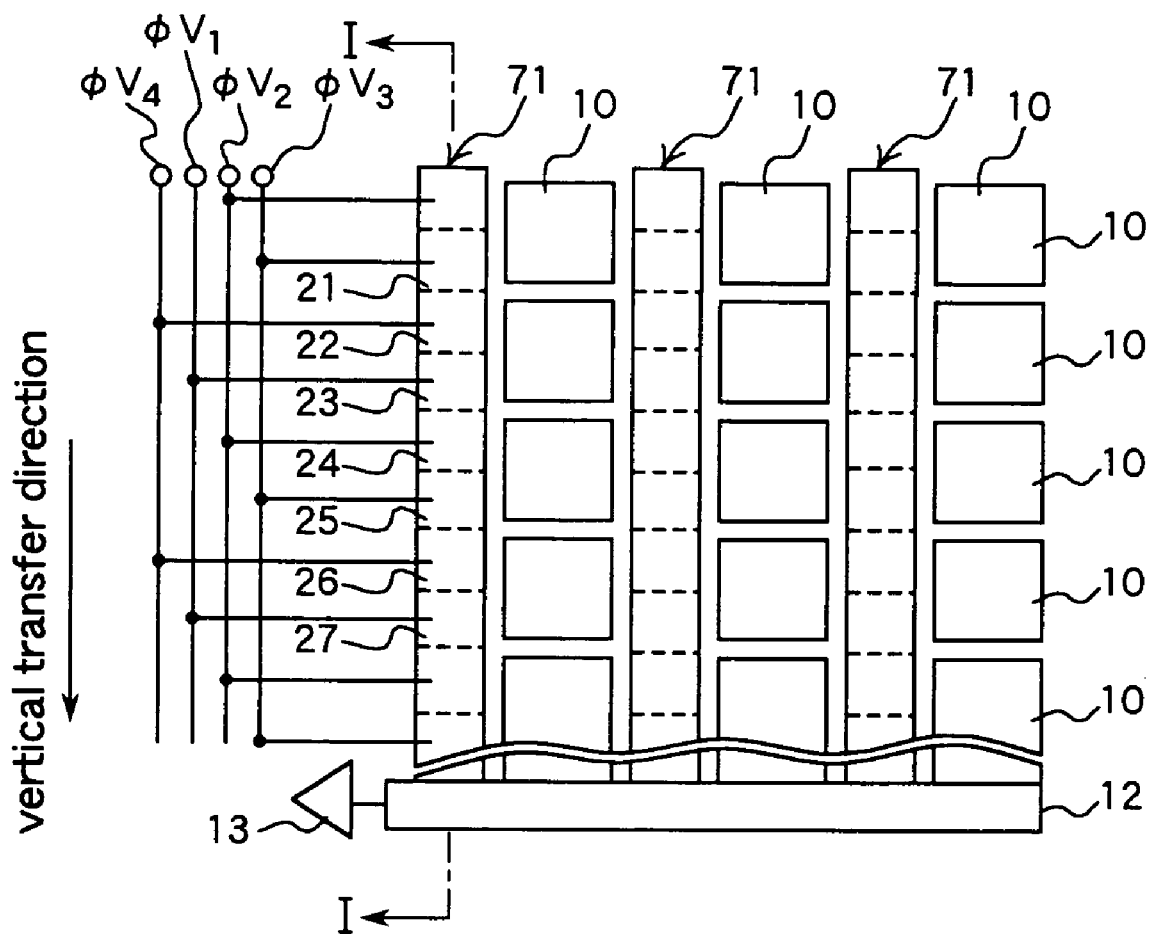
FIG. 1 is a top view of an embodiment of a solid state imaging device (so-called two-gate solid state imaging device), to which a driving method of the present invention can be applied.
Figure 2:
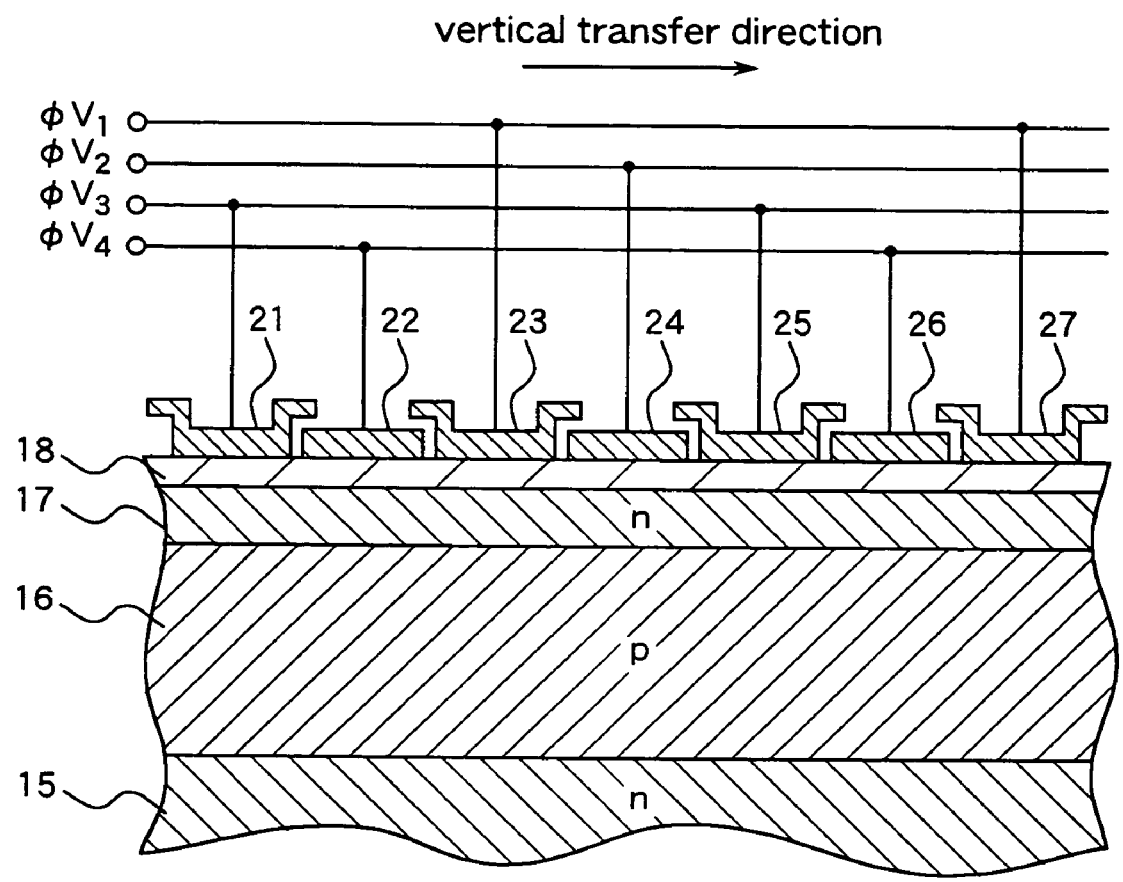
FIG. 2 shows a partial cross-section of the solid state imaging device in FIG. 1, taken along I—I.

The first embodiment of the present invention relates to a method for driving a so-called two-gate solid state imaging device. In this solid state imaging device, photodiodes 10 are arranged with some clearance between each other vertically and horizontally in a silicon substrate, as shown in FIG. 1 and in FIG. 2, which is a partial cross-sectional view of FIG. 1 taken along I—I. Between the photodiodes 10, which are arranged in rows and columns in this manner, vertical transfer regions 17 are formed, extending in parallel along the photodiode columns. In this embodiment, the vertical transfer regions 17 are n-type diffusion regions formed in a p-type well 16 of an n-type silicon substrate 15. Furthermore, an isolating film 18 is formed on the vertical transfer regions 17, and vertical transfer electrodes 71 are formed on the isolating film, two for each photodiode. To be specific, these vertical transfer electrodes 71 are formed as two-layer polysilicon films.

In this embodiment, so-called "four-phase" driving is applied to the vertical transfer electrodes 71. Therefore, each of the electrodes 21, 22 . . . 27 . . . constituting the vertical transfer electrodes 71 is connected to one of four wires, so that one of the four voltage patterns $\phi V_1$–$\phi V_4$ is applied to it. The connection between the electrodes and the wires is regular, following the array arrangement. The wires are connected to a controller, which is connected to a power source (not shown in the drawing).

Figure 3:
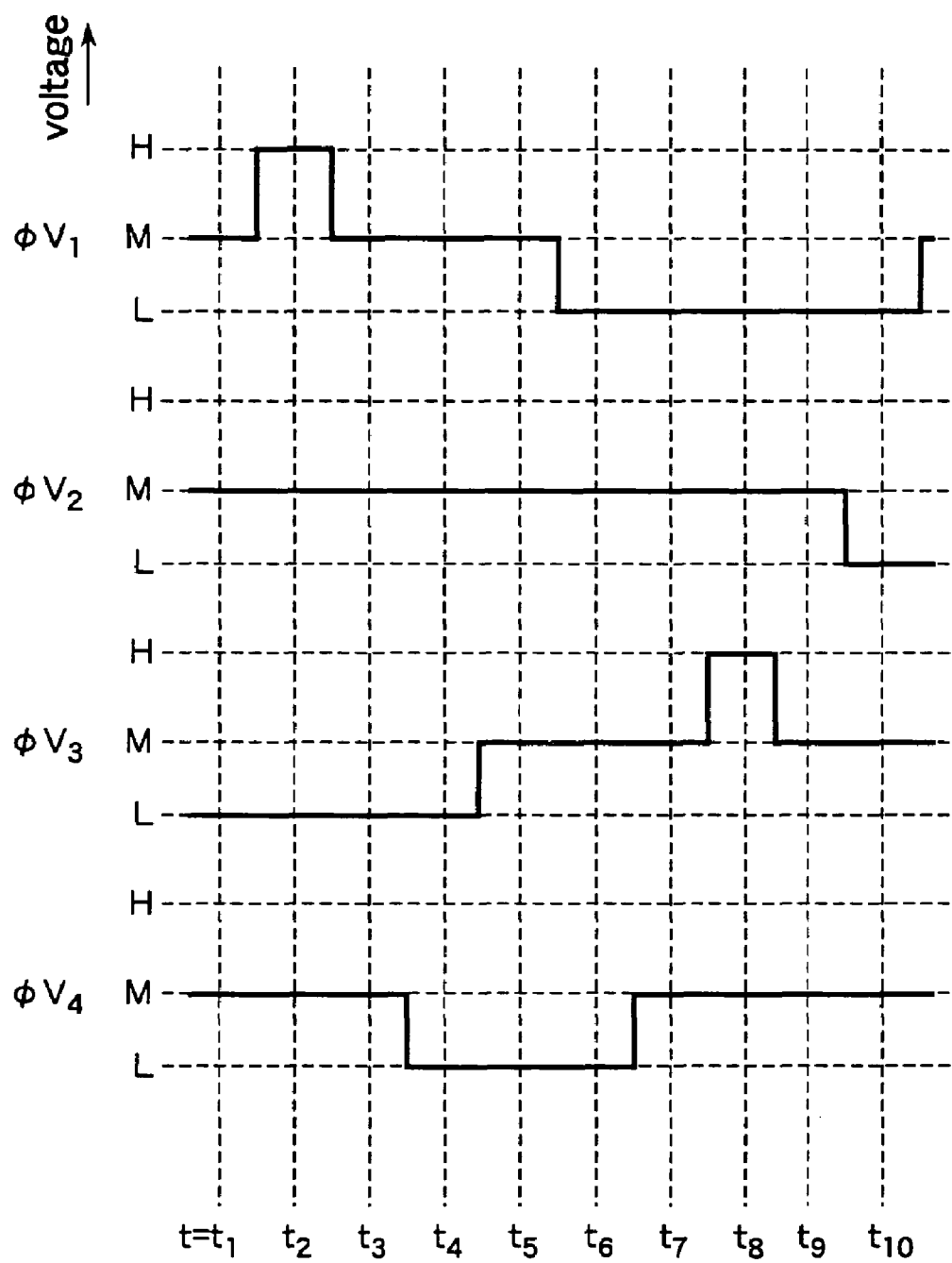
FIG. 3 shows a first field (Field A) in an embodiment for the voltage patterns applied to the vertical transfer electrodes, so as to drive the solid state imaging device shown in FIGS. 1 and 2.
Figure 4:
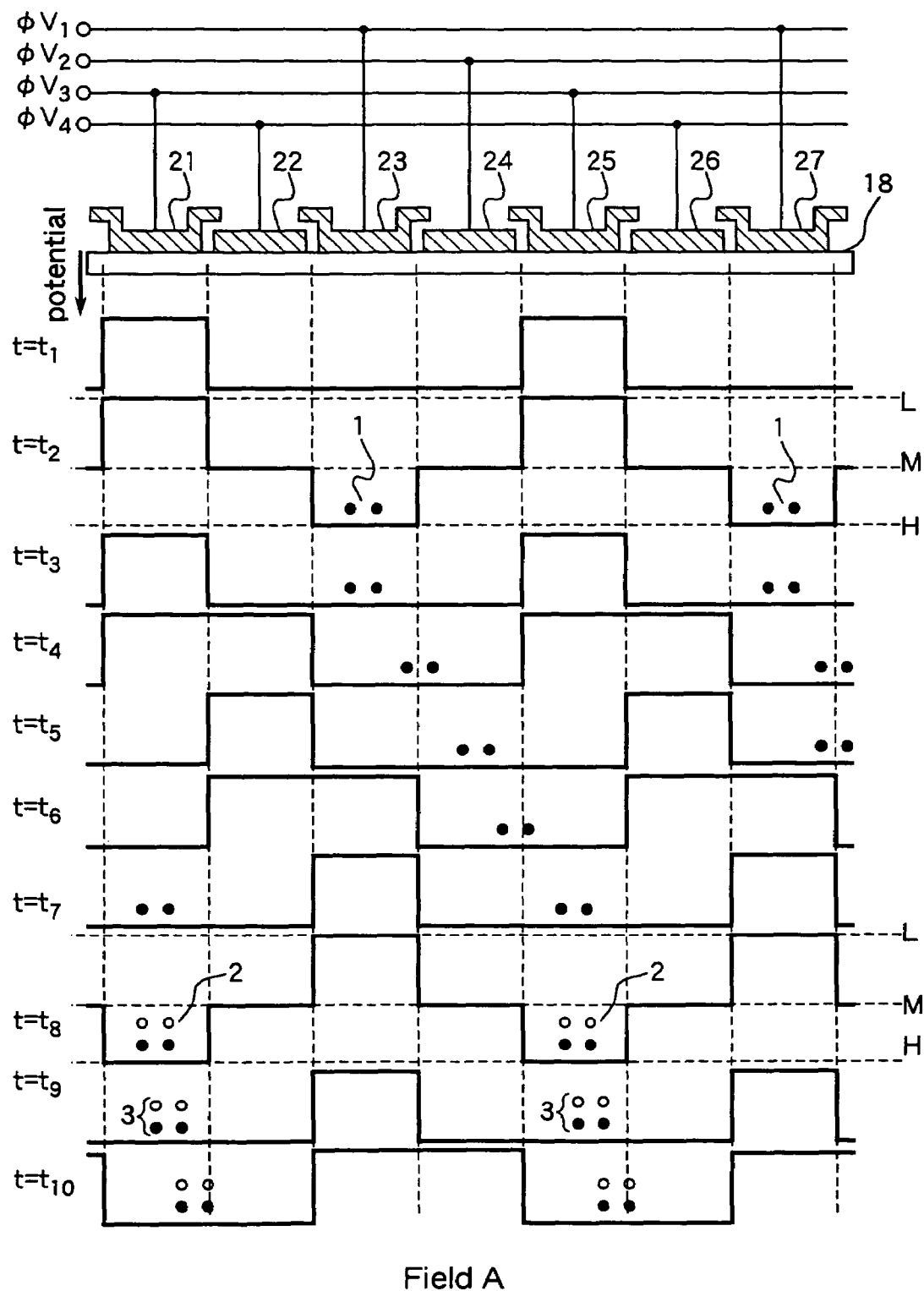
FIG. 4 shows the change of the potential that the application of the voltage patterns in FIG. 3 causes in the vertical transfer region of the solid state imaging device.

A method for driving this solid state imaging device is explained with reference to FIGS. 3 and 4. FIG. 3 shows the voltage patterns $\phi V_1$–$\phi V_4$ applied to the vertical transfer electrodes 71. The voltage patterns $\phi V_1$–$\phi V_4$ are achieved by holding voltages selected from a high voltage $V_H$, a medium voltage $V_M$ and a low voltage $V_L$ for certain periods of time. By applying these voltage patterns to the vertical transfer electrodes, the potential in the vertical transfer region changes over time ($t_1$–$t_{10}$), as shown in FIG. 4.

At the time $t_2$, $\phi V_1$ is held at the high voltage $V_H$ for reading. A voltage pulse extending before and after the time $t_2$ and peaking to $V_H$ is applied to the electrodes 23 and 27 serving as read-out electrodes, and signal charges 1 accumulated by the photodiodes 10 corresponding to these electrodes are read out towards the vertical transfer region, where the potential has been raised (denoted by "H" in the drawing). Thus, this embodiment first reads out a signal charge from every other photodiode in the vertical transfer direction.

At the time $t_2$, $\phi V_3$ is held at the low voltage $V_L$ for forming a potential barrier (denoted by "L" in the drawing). Applying a low voltage $V_L$ during read-out has the effect of preventing the signal charge 1 from unnecessary leakage and mixing. Conventionally, this low voltage $V_L$ was applied to the electrodes 22, 24 and 26 adjacent to the electrodes 23 and 25 reading out the signal charge. However, here the low voltage $V_L$ is applied to electrodes located at least one electrode away from the electrodes reading out the signal charge. If signal charges are read out with the electrodes 23 and 27, then the electrodes 24, 25 and 26 are located between these two electrodes, and only electrode 25 is not adjacent to either of the electrodes 23 and 27.

On the other hand, at the time $t_2$, $\phi V_2$ and $\phi V_4$ are held at an intermediate voltage $V_M$ that is lower than the high voltage $V_H$ and higher than the low voltage $V_L$. Thus, a voltage $V_M$, which is between the high voltage $V_H$ and the low voltage $V_L$, is applied to all of the electrodes 22, 24, and 26 adjacent to the electrodes 23 and 27 reading out the signal charge.

Inserting electrodes to which an intermediate voltage $V_M$ is applied between the electrodes to which the high voltage $V_H$ is applied and the electrodes to which the low voltage $V_L$ is applied, the potential of the vertical transfer region forms an intermediate step (denoted by "M" in the drawing) at the time $t_2$, which provides for smoother steps than in the conventional methods.

Subsequently, at the times $t_3$–$t_7$ the signal charge 1 is transferred vertically. During this time, a low voltage $V_L$ and an intermediate voltage $V_M$ are applied to the electrodes.

When the time $t_8$ has been reached, a high voltage $V_H$ for read-out is applied to the electrodes 21 and 25 serving as read-out electrodes, and a signal charge 2 is read out from the photodiodes corresponding to these electrodes. In order to read out, $\phi V_3$ is being held at the high voltage $V_H$ at the time $t_8$. Similarly to the distribution at the time $t_2$, the voltage patterns $\phi V_1$, $\phi V_2$ and $\phi V_4$ at the time $t_8$ also are controlled so that electrodes to which an intermediate voltage $V_M$ is applied are located between electrodes to which a high voltage $V_H$ is applied and electrodes to which a low voltage $V_L$ is applied.

The signal charge 2 that is newly read out at the time $t_8$ is mixed during the read-out with the signal charge 1, which already has been transferred to the position where the signal charge 2 is being read out. The attained signal charge 3 for two photodiodes (two pixels) in the vertical transfer direction is then further transferred in the vertical direction during the times $t_9$ and $t_{10}$.

Figure 5:
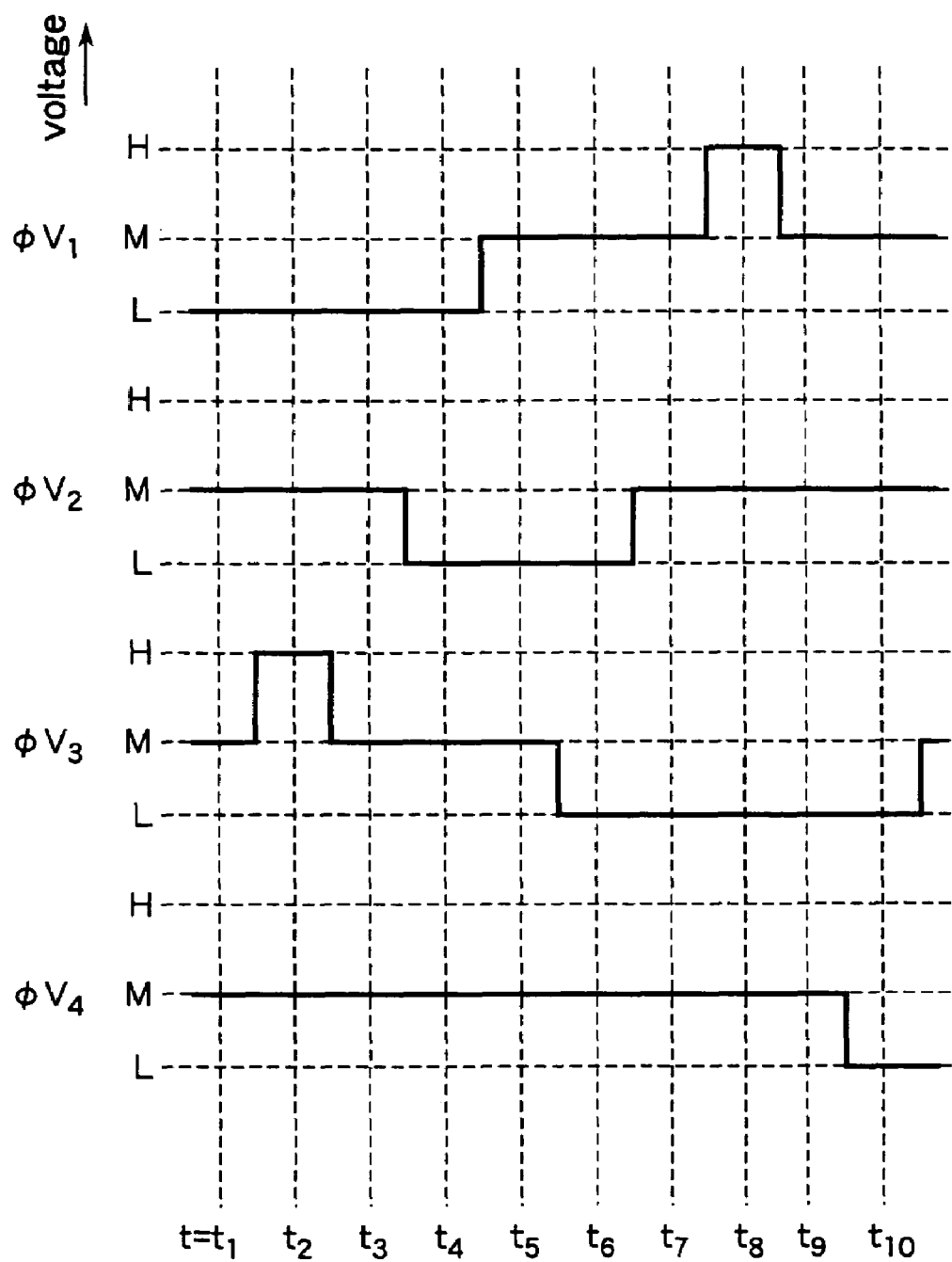
FIG. 5 shows a second field (Field B) in the above embodiment for the voltage patterns applied to the vertical transfer electrodes, so as to drive the solid state imaging device shown in FIGS. 1 and 2.
Figure 6:
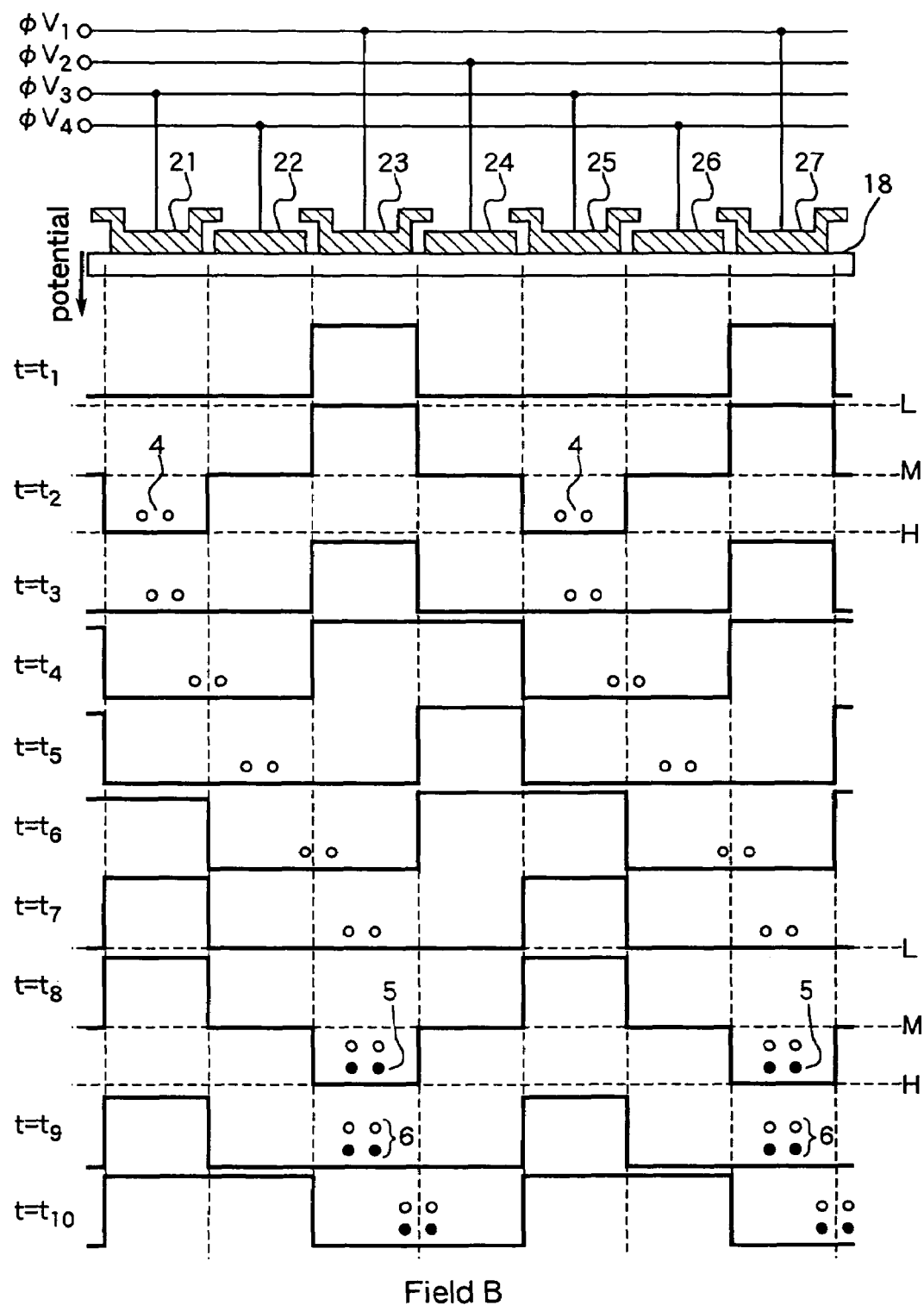
FIG. 6 shows the change of the potential that the application of the voltage patterns in FIG. 5 causes in the vertical transfer region of the solid state imaging device.

This series of operations of read-out and transfer of signal charges as explained above is performed as the Field A, and subsequently a series of operations of the Field B is performed. The voltage patterns $\phi V_1$–$\phi V_4$ and the potential changes of the vertical transfer regions occurring when the voltage patterns $\phi V_1$–$\phi V_4$ are applied in the Field B are shown in FIGS. 5 and 6, respectively.

In the Field B, in contrast to the Field A, signal charges 4 are read out first from the electrodes 21 and 25 (time $t_2$), and then signal charges 5 are read out from the electrodes 23 and 27 and simultaneously mixed with the signal charges 4 (time $t_8$). As a result, a mixed signal charge 6 for two pixels is obtained from a combination of photodiodes that is different than for the signal charge 3 in the Field A. Other aspects with regard to the operations of read-out and transfer of the signal charge in the Field B are similar to the operations in the Field A.

In this embodiment, voltage pulses are applied from a controller (not shown in the drawings) so that the Field A and the Field B are applied alternately to achieve interlacing. In either field, once the signal charge has been transferred vertically to the horizontal transfer region 12, it is transferred horizontally in that region, until it reaches an output amplifier 13. The steps following the above-described operations, such as the horizontal transfer of the signal charge, can be performed by conventional methods, so that their further detailed description has been omitted.

While there is no particular limitation for the values of $V_H$, $V_M$ or $V_L$, an example for particular values is $V_H$=15V, $V_M$=0V, and $V_L$=–7V. It is preferable that $V_M$ is 0V.

Figure 7:
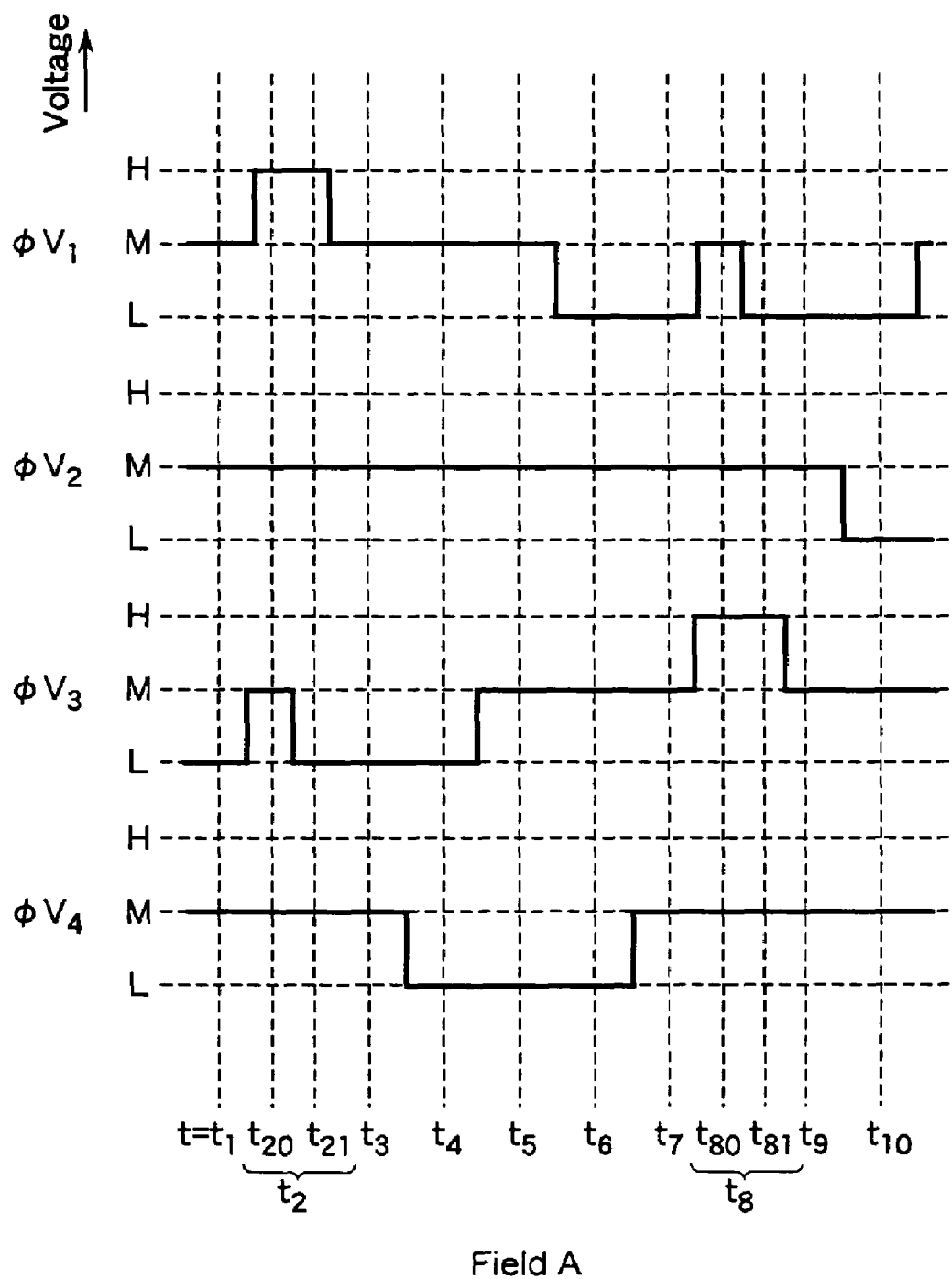
FIG. 7 shows another example of voltage patterns in FIG. 3.
Figure 8:
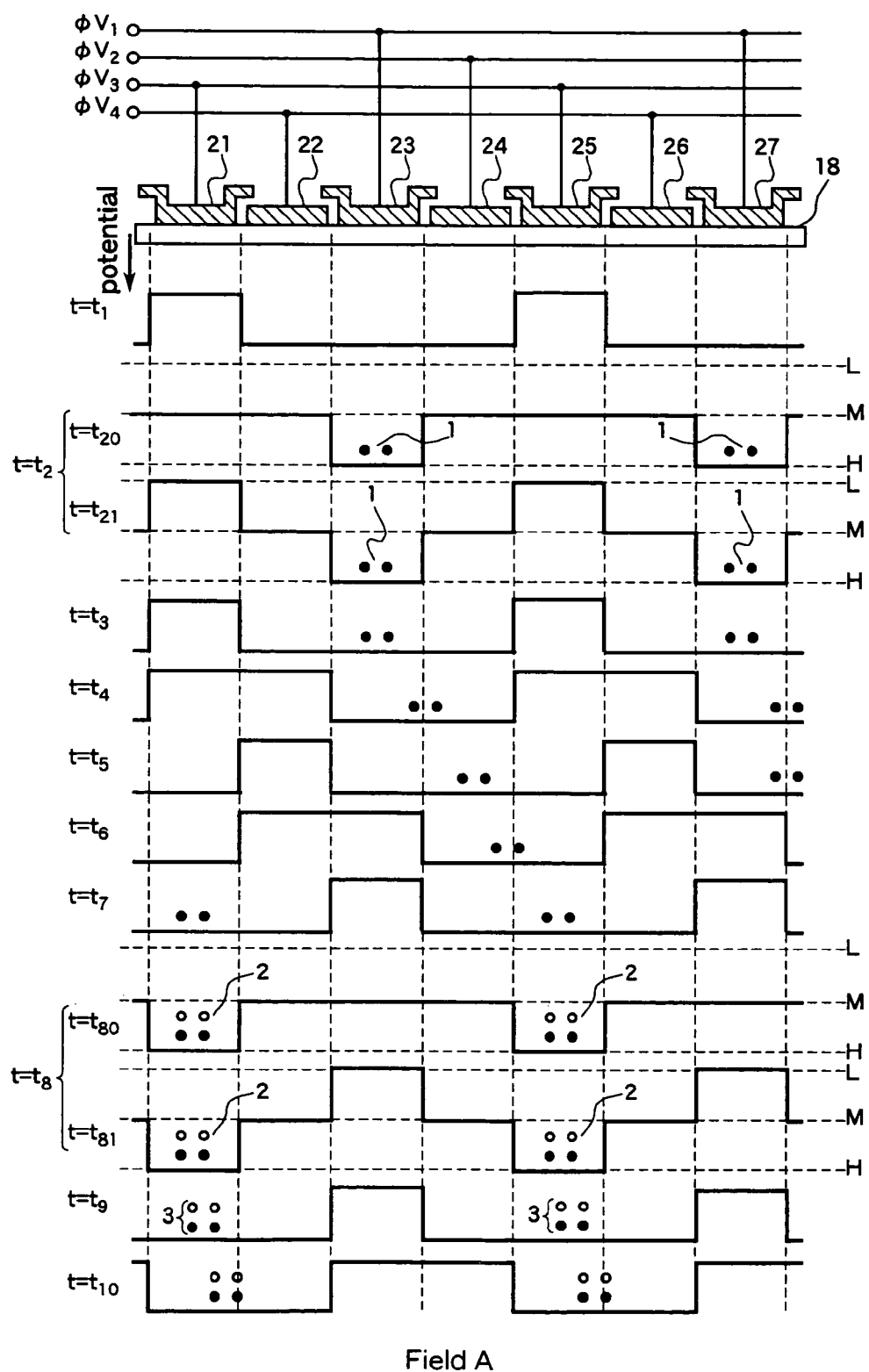
FIG. 8 shows the change of the potential that the application of the voltage patterns in FIG. 7 causes in the vertical transfer region of the solid state imaging device.

As another method for driving the solid state imaging device, it is also possible to apply the voltage patterns $\phi V_1$–$\phi V_4$ shown in FIGS. 7 and 8 instead of the voltage patterns $\phi V_1$–$\phi V_4$ of FIGS. 3 and 4. In other words, FIGS. 7 and 8 illustrate an alternative voltage pattern and resulting change in potential over a representative time period $t_1$–$t_{10}$ in which signal charges are read out of electrodes 21–27 into a transfer region 17. In these voltage patterns, the voltage applied to the electrode 25 at $t_2$ (the electrode in which $V_H$ is not applied nor is adjacent to the electrode in which $V_H$ is applied) changes from an intermediate voltage $V_M$ ($t_{20}$) to a low voltage $V_L$ ($t_{21}$).

Figure 9:
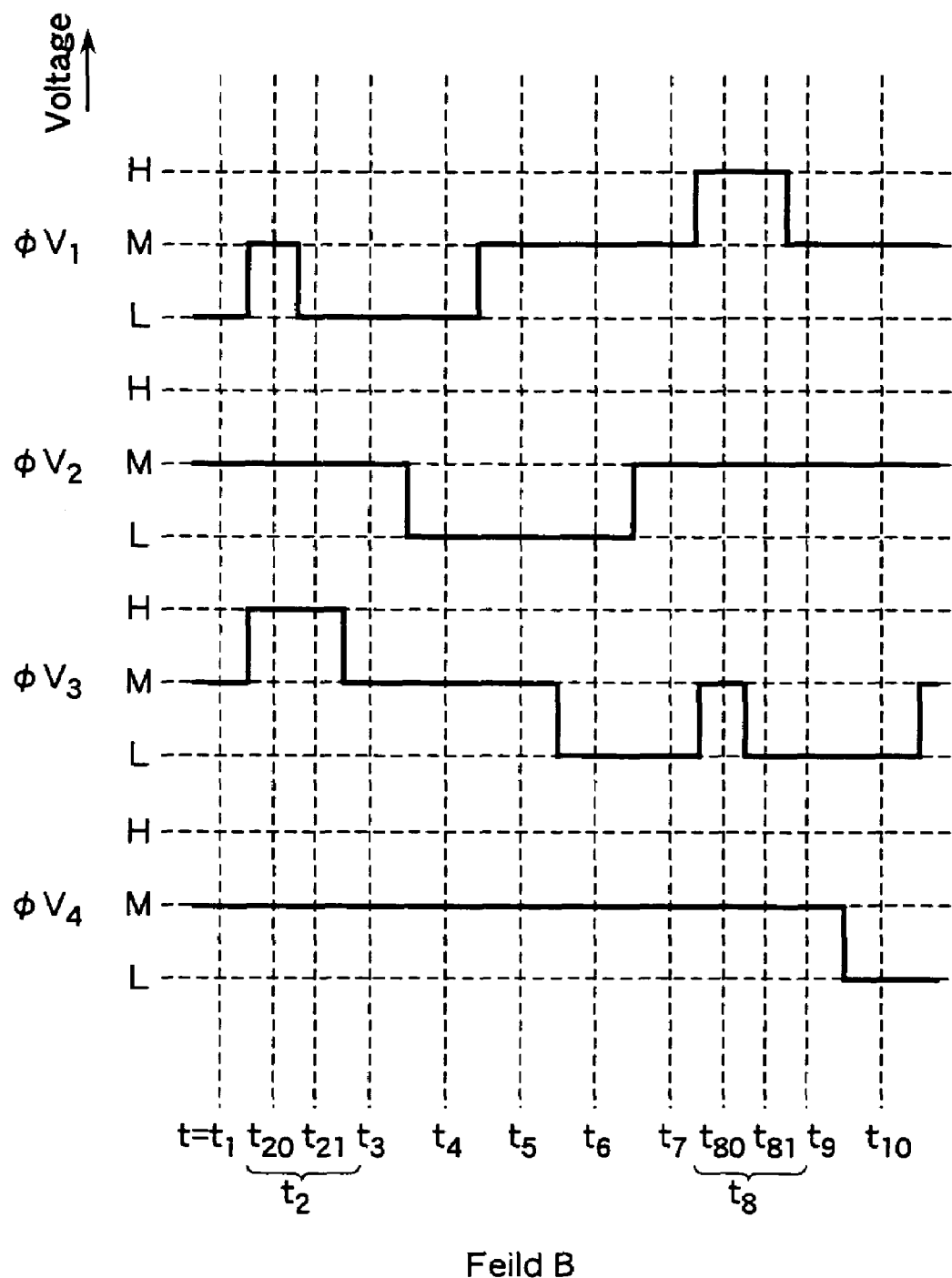
FIG. 9 shows another example of voltage patterns in FIG. 5.
Figure 10:
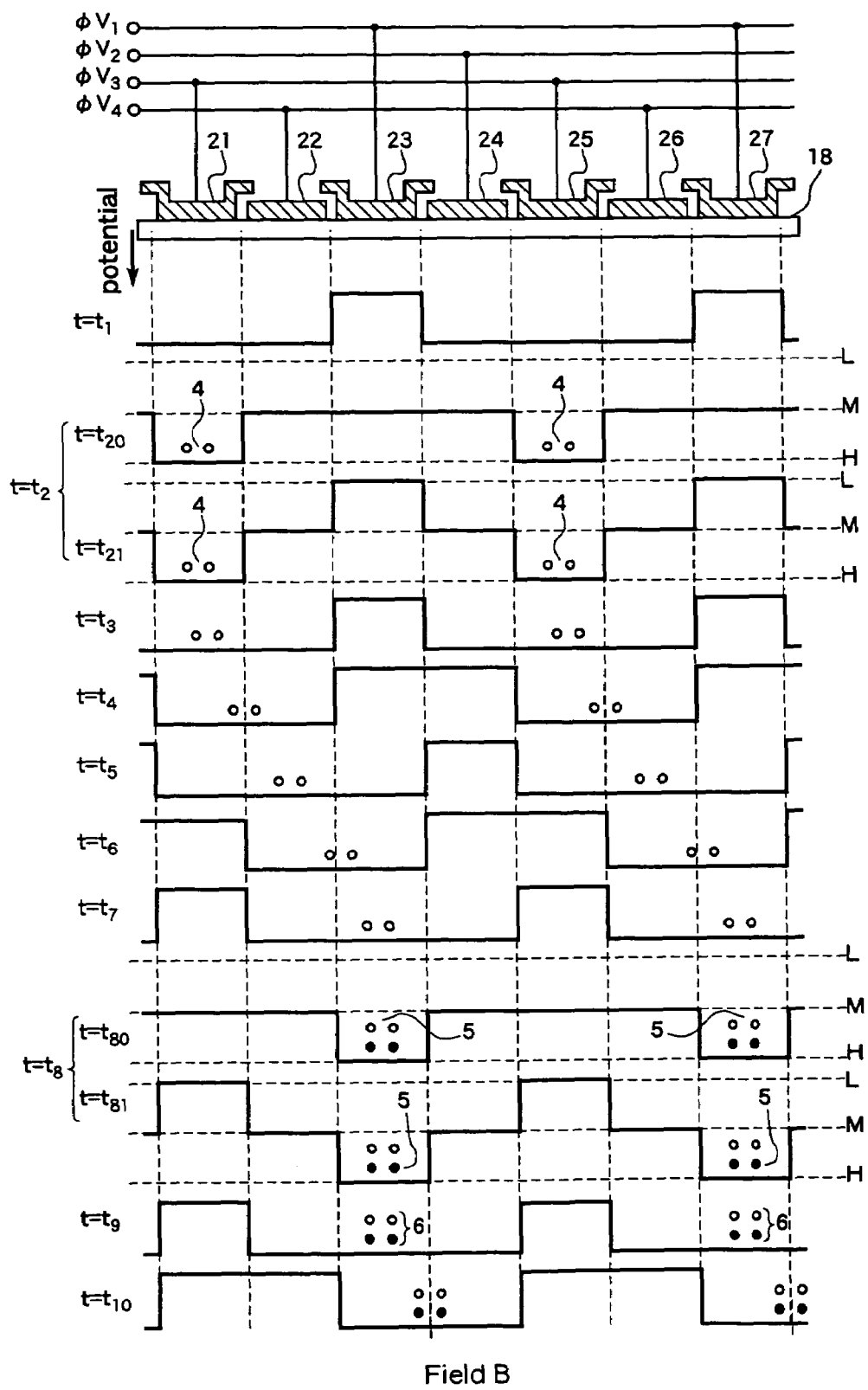
FIG. 10 shows the change of the potential that the application of the voltage patterns in FIG. 9 causes in the vertical transfer region of the solid state imaging device.

Moreover, in the voltage patterns $\phi V_1$–$\phi V_4$ of FIGS. 7 and 8, as in the patterns shown in FIGS. 3 and 4, the voltage difference applied between adjacent electrodes is relaxed. This is, because the afore-mentioned "opposite voltage change" is applied to the electrode 25, which is not adjacent to the electrodes 23 and 27 reading out the signal charge. Now, the voltage patterns $\phi V_1$–$\phi V_4$ of FIGS. 7 and 8 are similar to the patterns shown in FIGS. 3 and 4, except for the voltage changes at the times $t_2$ and $t_8$ (also at $t_8$, an opposite voltage change similar to the one at $t_2$ is applied), so that their further explanation has been omitted. The voltage patterns $\phi V_1$–$\phi V_4$ for the Field B corresponding to FIGS. 5 and 6 are shown in FIGS. 9 and 10.

Although in FIG. 7 the opposite voltage change to electrode 25 is illustrated as being applied during the time when the high voltage $V_H$ is applied to electrodes 23 and 27, the opposite voltage change also can be applied during a predetermined period of time immediately before the period in which the voltage for reading out the signal charge is applied. In that case, the potential shift of the photodiodes is more effective, when the time from the application of the opposite voltage change to the application of the voltage for reading out the signal charge is short, because then the amount of potential balance is large. This time should be within the period until canceling the state of imbalance due to the above-noted opposite voltage change. This period is determine by the time constant for returning to the balanced state, which changes in accordance with the electrical resistance of the well (p-layer). Considering typical electrical resistance of impurity layers, it is preferable that this time is not longer than 5 μs (5 microseconds), more preferably not longer than 1 μs, most preferably not longer than 0.5 μs. In other words, the transition from $V_M$ to $V_L$ that is shown occurring between $t_{20}$ and $t_{21}$ corresponding to $\phi V_3$ (i.e, electrodes 21 and 25) can occur from a predetermined time prior to the transition from $V_M$ to $V_H$ between ($t_1$) and ($t_{20}$) until the transition from $V_H$ to $V_M$ between ($t_{21}$) and ($t_3$), which correspond to $\phi V_1$ (i.e, electrodes 23 and 27). According to some embodiments, the time period could, for example, start from $t_1$, which is prior to $\phi V_1$ transitioning from $V_M$ to $V_H$ and end between ($t_1$) and ($t_{20}$) concurrent with $\phi V_1$ transitions from $V_H$ to $V_M$.

A larger effect can be attained when the application of the opposite voltage change is not simultaneous to the application of the read-out voltage $V_H$, but directly preceding the application of $V_H$ or after beginning the application of $V_H$.

Moreover, the photodiodes corresponding to the electrodes 23 and 27 to which the high voltage $V_H$ is applied and the photodiodes corresponding to the electrodes 21 and 25 to which the opposite voltage change is applied are not the same, but adjacent to each other. Because the photodiodes are electrically floating, the electrodes corresponding to the same photodiodes are capacitively coupled to each other through the photodiodes. Therefore, when the above-noted opposite voltage change is applied to the electrodes corresponding to the photodiodes reading out the signal charge, the influence of the capacitive coupling causes the effective read-out voltage to be lower than the applied voltage $V_H$. However, when this opposite voltage change is applied to the electrodes corresponding to the adjacent photodiodes, as in the above embodiment, then a reduction of the read-out voltage due to the potential shift of the photodiodes can be realized while eliminating the influence of the capacitive coupling.

Second Embodiment

This embodiment relates to another method for driving a two-gate solid state imaging device. The solid state imaging device used in this embodiment is similar to the solid state imaging device used in the first embodiment, so that further explanations have been omitted.

Figure 11:
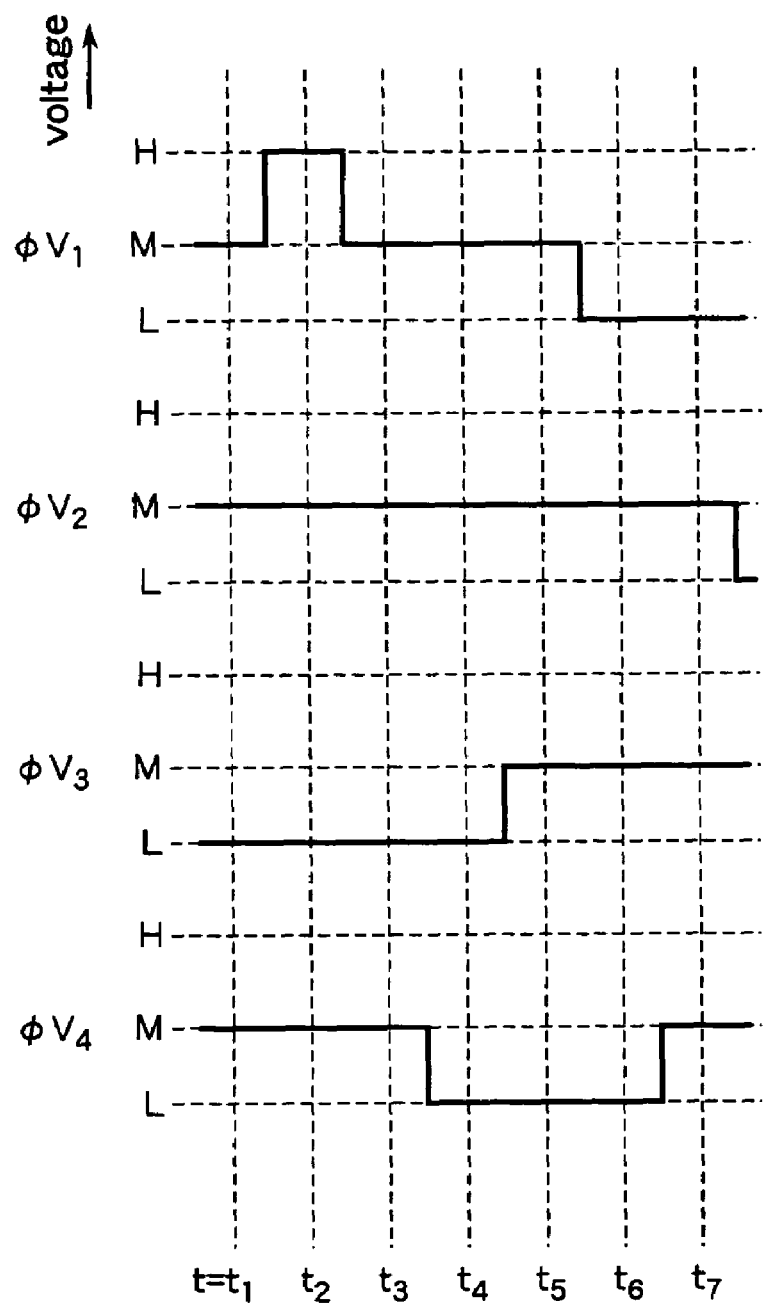
FIG. 11 shows a first field (Field A) in another embodiment for the voltage patterns applied to the vertical transfer electrodes, so as to drive the solid state imaging device shown in FIGS. 1 and 2.
Figure 12:
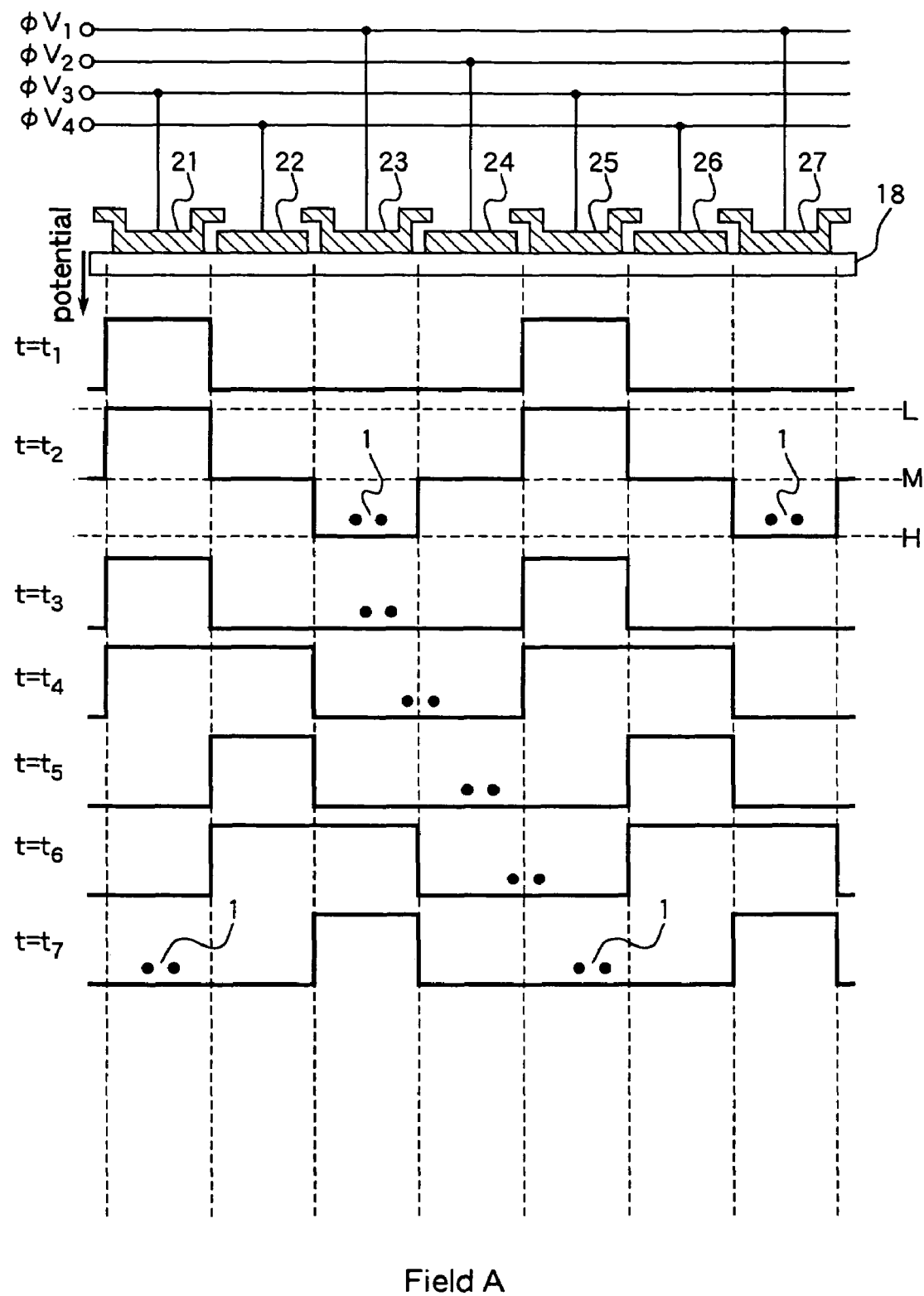
FIG. 12 shows the change of the potential that the application of the voltage patterns in FIG. 11 causes in the vertical transfer region of the solid state imaging device.

In this embodiment, signal charges are transferred independently, without mixing in the vertical transfer region. In particular, as in the first embodiment, signal charges 1 are read out in the Field A from the photodiodes corresponding to the electrodes 23 and 27, which is illustrated in FIGS. 11 and 12. However, in this embodiment, the signal charges 1 are transferred to the horizontal transfer region (and in the horizontal transfer region) independently without mixing with other signal charges.

Figure 13:
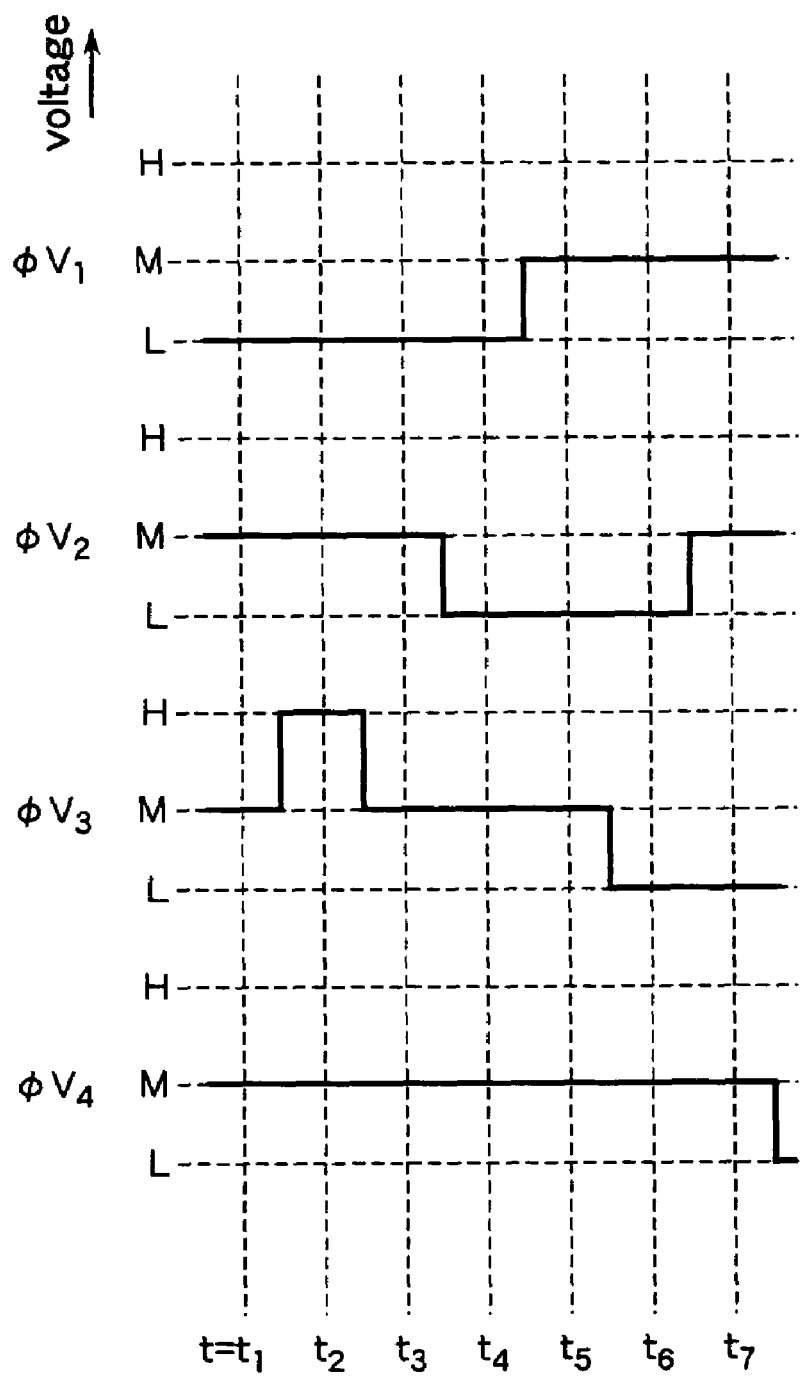
FIG. 13 shows a second field (Field B) in another embodiment for the voltage patterns applied to the vertical transfer electrodes, so as to drive the solid state imaging device shown in FIGS. 1 and 2.
Figure 14:
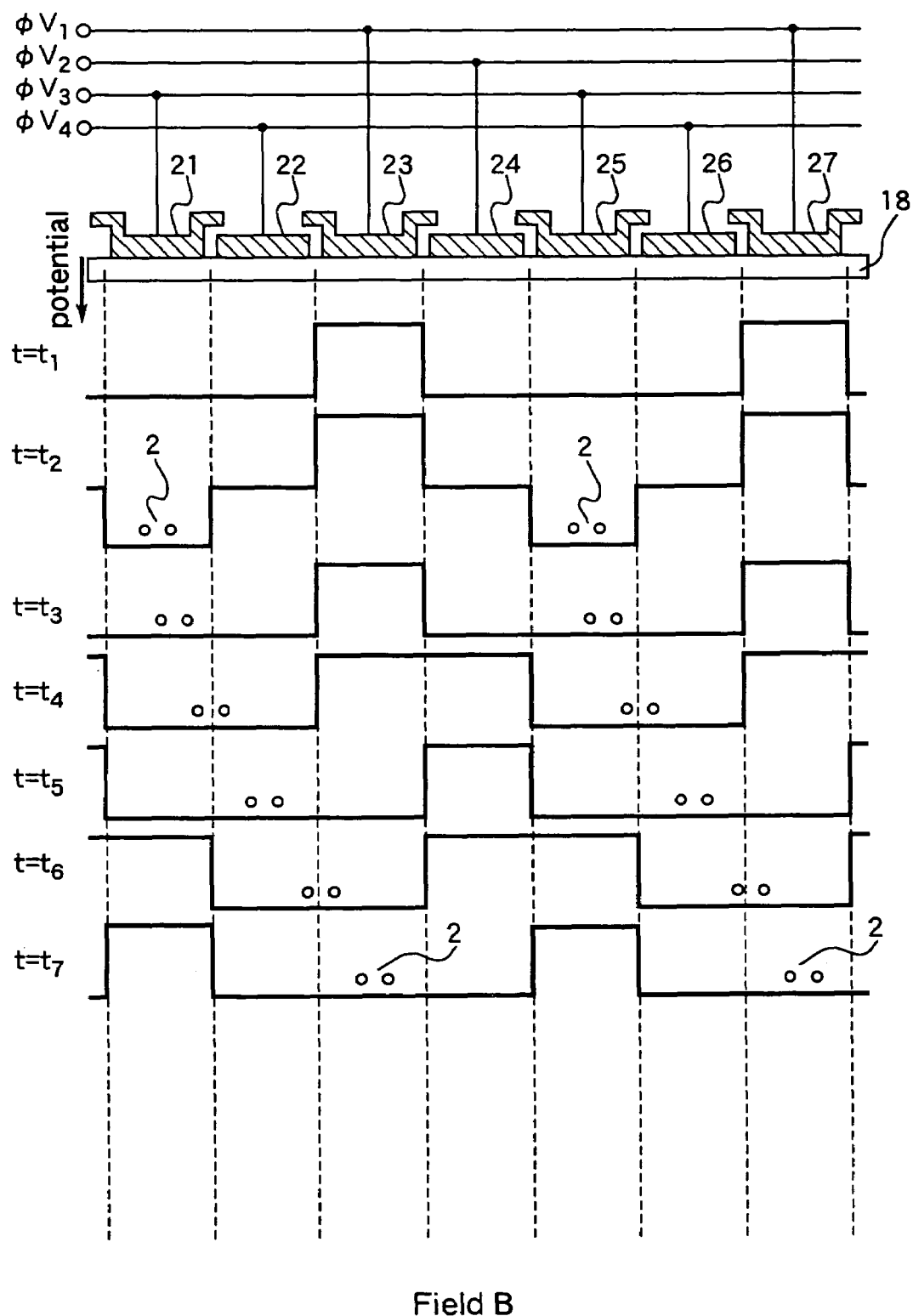
FIG. 14 shows the change of the potential that the application of the voltage patterns in FIG. 13 causes in the vertical transfer region of the solid state imaging device.
Figure 15:
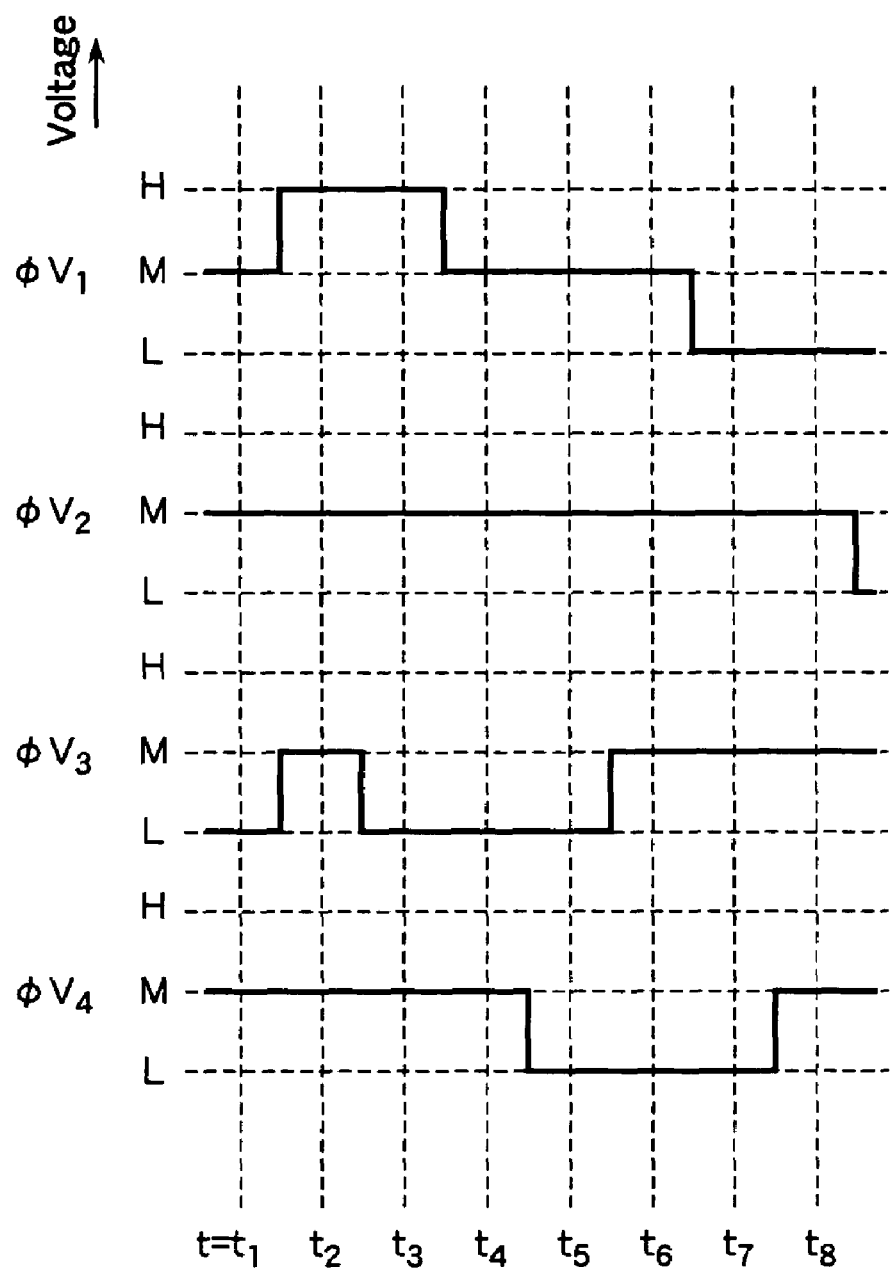
FIG. 15 shows another example of the voltage patterns in FIG. 11.
Figure 16:
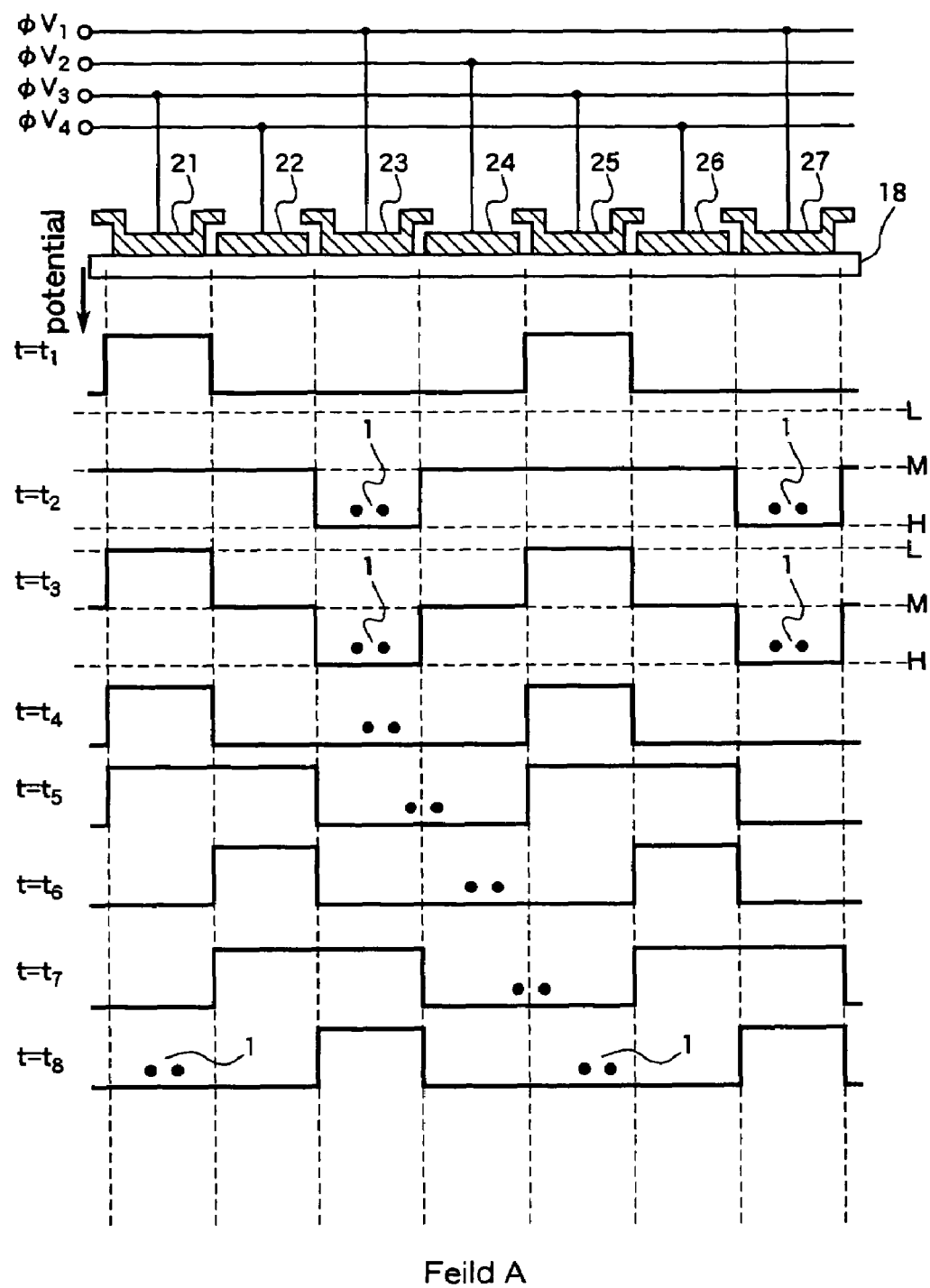
FIG. 16 shows the change of the potential that the application of the voltage patterns in FIG. 15 causes in the vertical transfer region of the solid state imaging device.
Figure 17:
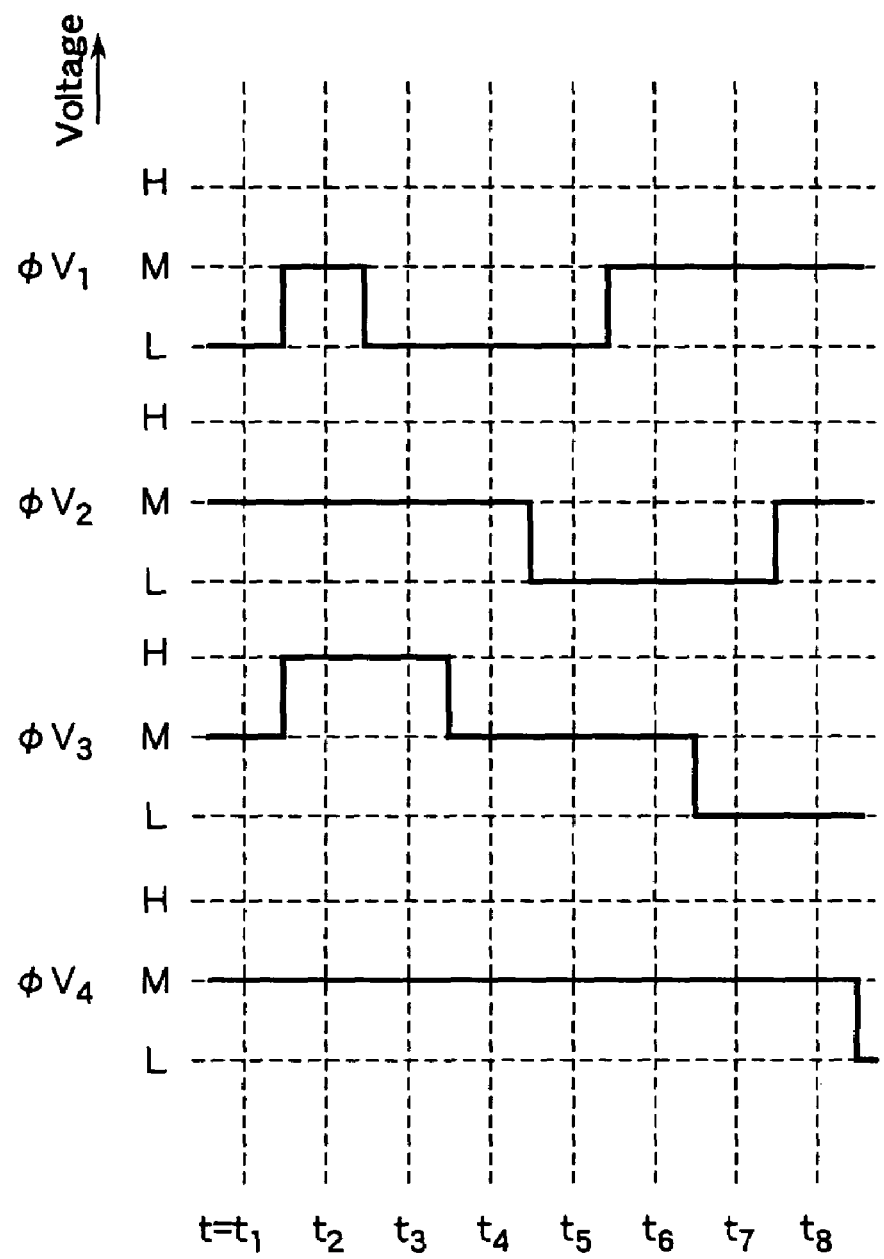
FIG. 17 shows another example of voltage patterns in FIG. 13.
Figure 18:
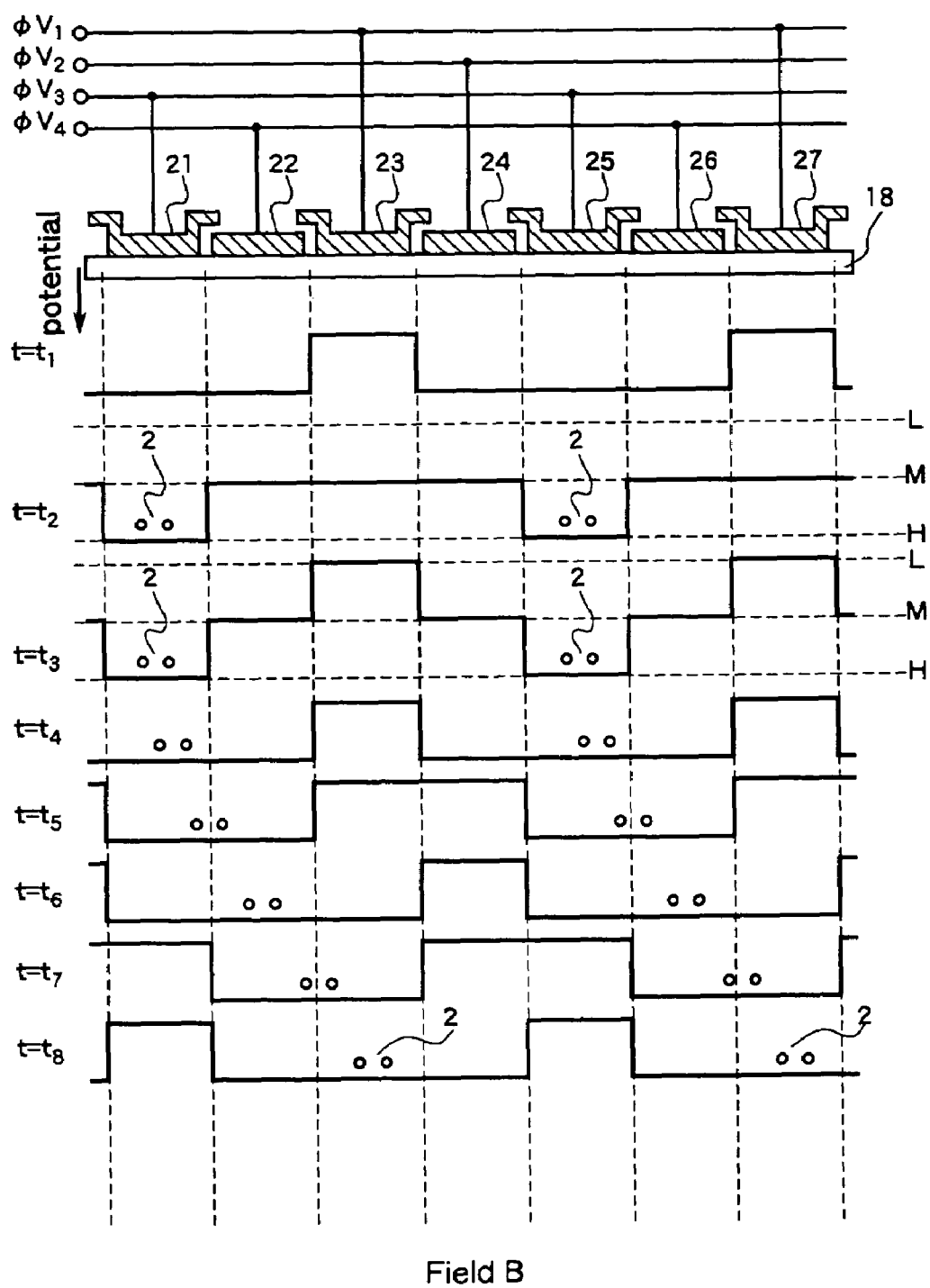
FIG. 18 shows the change of the potential that the application of the voltage patterns in FIG. 17 causes in the vertical transfer region of the solid state imaging device.

In the Field B, signal charges 2 are read out from the electrodes 21 and 25, as shown in FIGS. 13 and 14, and these signal charges too are transferred vertically and then horizontally without mixing with other signals.

In this manner, different from the first embodiment, the interlacing in the second embodiment is performed by reading out the signal charges independently.

Also in this second embodiment, as in the first embodiment, the voltage for read-out can be lowered by applying an "opposite voltage change" during or directly preceding the time when the voltage for reading out the signal charges is applied. Examples for such a voltage pattern are shown in FIGS. 15–18. This is not specifically mentioned in the following, and while there are no voltage patterns given as examples, this is similar in the third and following embodiments.

Third Embodiment

This embodiment relates to a method for driving a so-called three-gate solid state imaging device. Also with three gates, read-out and transfer of the signal charges are in principle possible with the same method as explained for the above embodiments. However, different from the preceding embodiments, this embodiment relates to a driving method, in which signal charges can be read out from all photodiodes arranged in the vertical transfer direction within a single field.

Figure 19:
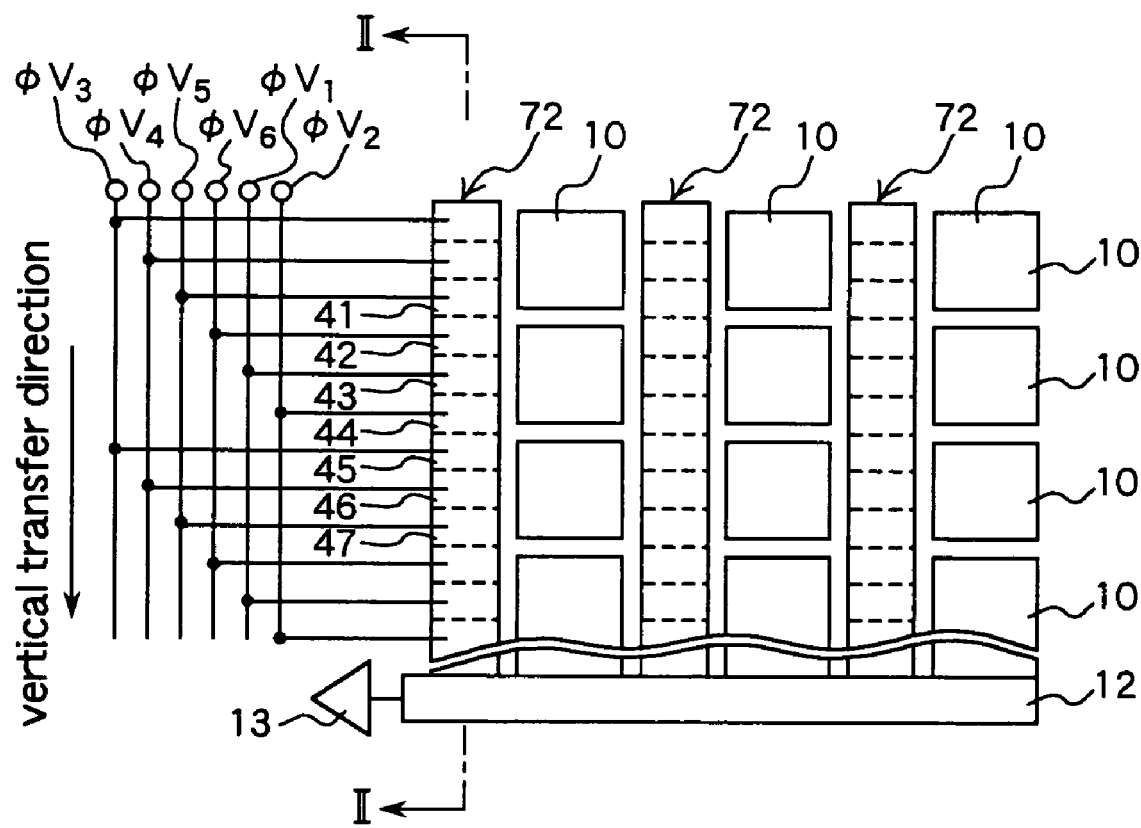
FIG. 19 is a top view of an embodiment of a solid state imaging device (so-called three-gate solid state imaging device), to which a driving method of the present invention can be applied.
Figure 20:
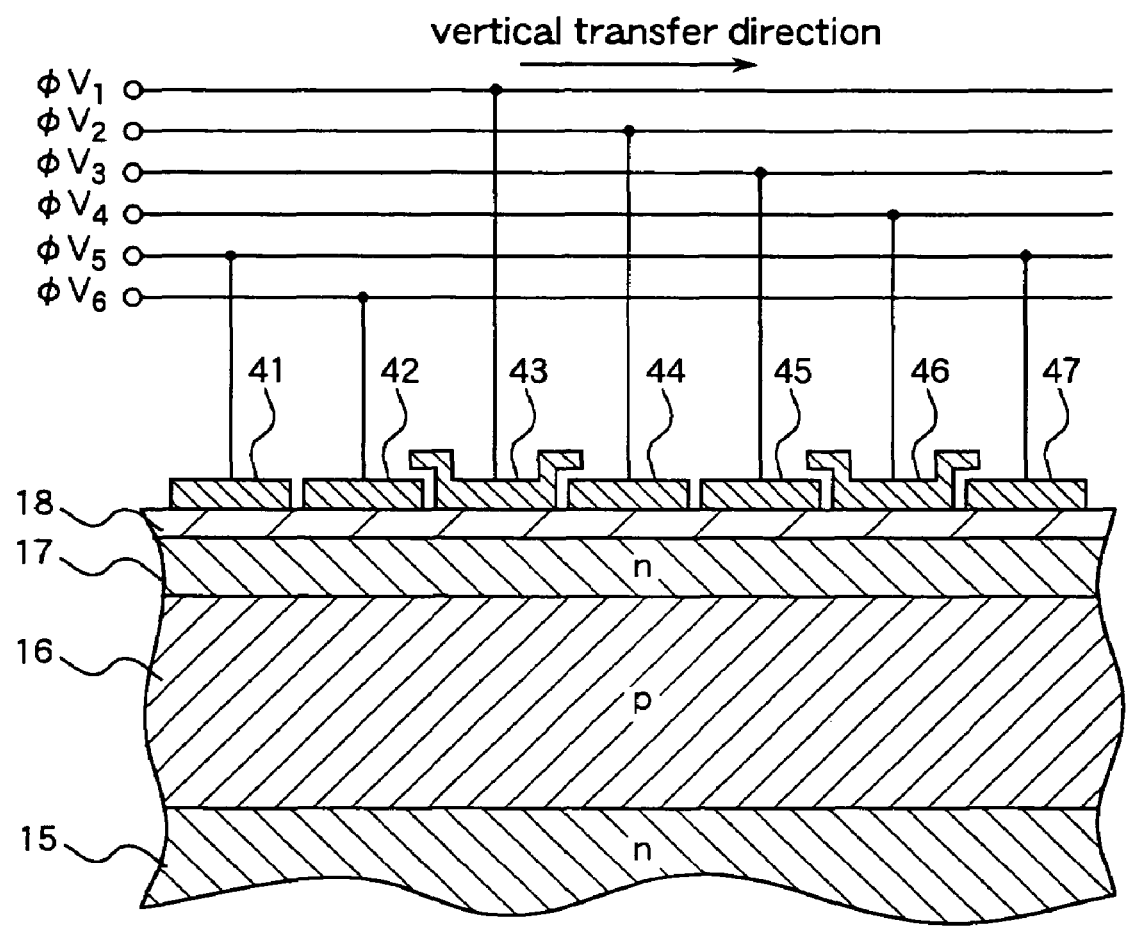
FIG. 20 shows a partial cross-section of the solid state imaging device in FIG. 19, taken along II—II.

To carry out such a driving method, a solid state imaging device as shown in FIGS. 19 and 20 (which is a partial cross-section taken along II—II) is appropriate. Conventionally, so-called three-phase driving is used for three-gate solid state imaging devices. However, in the solid state imaging device of this embodiment, a total of six wires are connected to the electrodes 41, 42 . . . 47 . . . of the three gates, which allows six-phase driving. With six-phase driving, the aforementioned driving method can be carried out as explained below. It should be noted that the basic configuration of the solid state imaging device is the same as in the first embodiment, and therefore its further detailed explanation has been omitted here.

Figure 21:
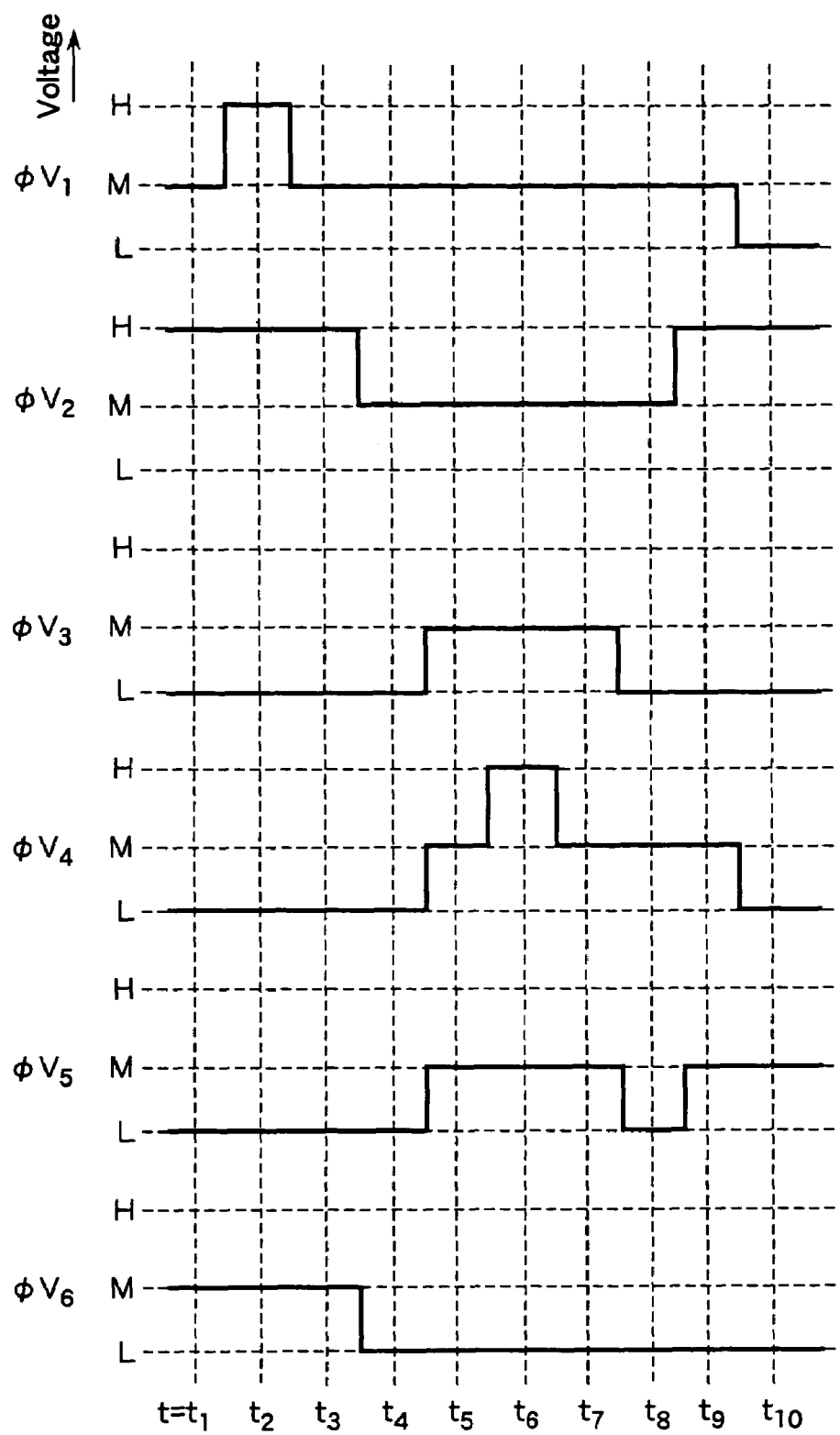
FIG. 21 shows an embodiment for the voltage patterns applied to the vertical transfer electrodes, so as to drive the solid state imaging device shown in FIGS. 19 and 20.

FIG. 21 shows the voltage patterns $\phi V_1$–$\phi V_6$ applied to the vertical transfer electrodes 72. The voltage patterns $\phi V_1$–$\phi V_6$ are achieved by holding voltages selected from a high voltage $V_H$, a medium voltage $V_M$ and a low voltage $V_L$ for certain periods of time. The voltage patterns $\phi V_1$–$\phi V_6$ can be classified into a first set ($\phi V_6$, $\phi V_1$ and $\phi V_2$) and a second set ($\phi V_3$, $\phi V_4$, and $\phi V_5$), depending on the group of electrodes to which they are applied. The electrode groups to which these two sets of voltage patterns are applied correspond to groups of light-receiving portions arranged alternately.

Figure 22:
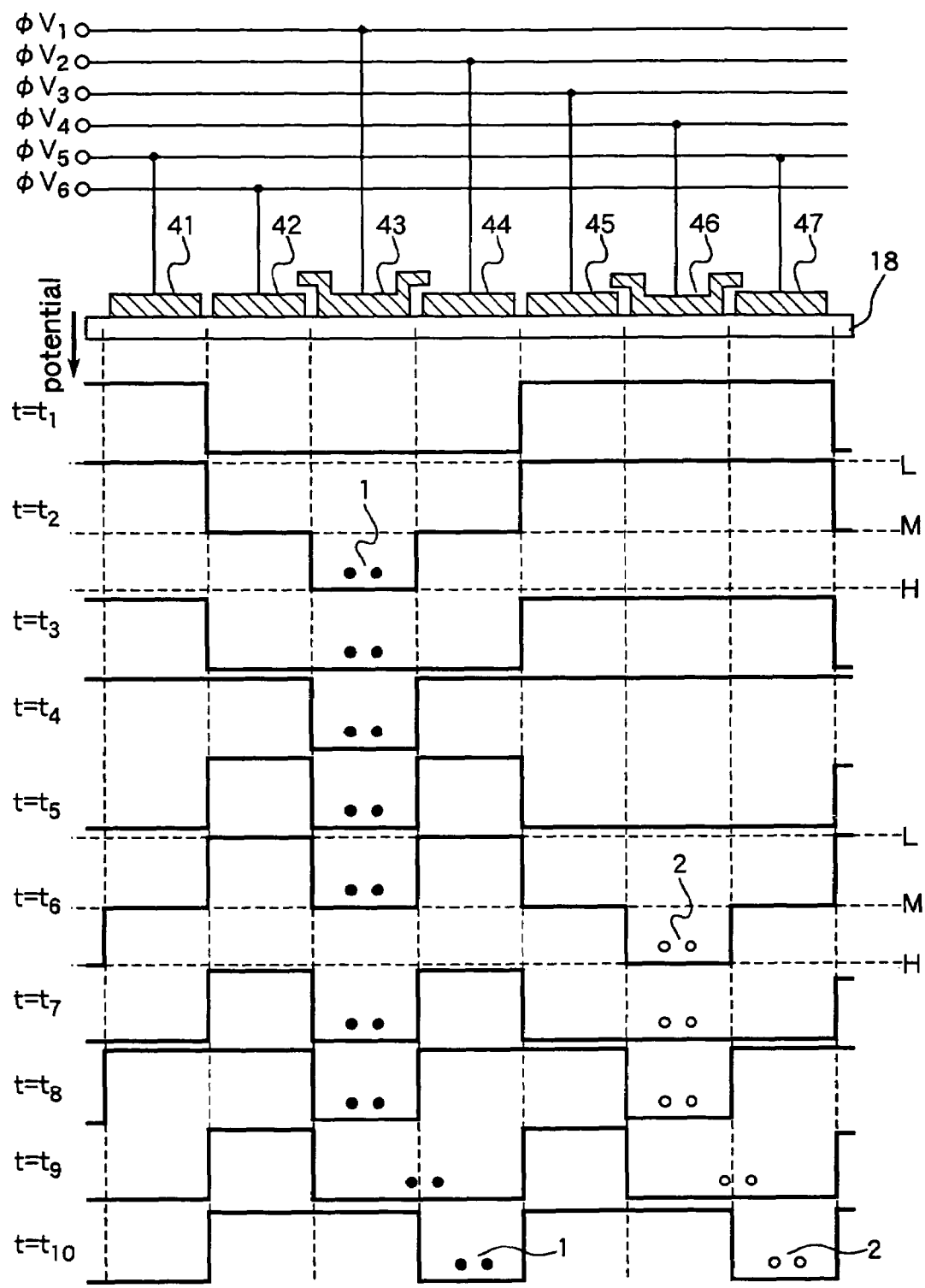
FIG. 22 shows the change of the potential that the application of the voltage patterns in FIG. 21 causes in the vertical transfer region of the solid state imaging device.

In this manner, voltage patterns that can be classified into at least two sets are applied to the electrode groups through at least two sets of corresponding wires, so that the vertical transfer region is subjected to a potential change whose passage over time ($t_1$–$t_{10}$) is shown in FIG. 22.

At the time $t_2$, $\phi V_1$ is held at a high voltage $V_H$ for read-out. A voltage pulse extending from before to after the time $t_2$ and peaking to the high voltage $V_H$ is applied to the electrode 43, which is one of the electrodes serving for read-out, and a signal charge 1, which has accumulated in the photodiode 10 corresponding to this electrode, is read out to the vertical transfer region. At the time $t_2$, signal charges 1 are read out from every other photodiode in the vertical transfer direction, as in the first and the second embodiment.

Also in this embodiment, $\phi V_2$ and $\phi V_6$ are held at an intermediate voltage $V_M$ at the time $t_2$, so that the potentials of the electrodes 42 and 44 adjacent to the electrode 43 reading out the signal charge 1 are not pulled down too much.

Moreover, at the time $t_2$, with the voltage patterns $\phi V_3$, $\phi V_4$ and $\phi V_5$, a low voltage $V_L$ is applied to the electrodes 41, 45, 46 and 47, which are located between electrodes reading out the signal charges at this time, and are not adjacent to electrodes reading out the signal charges. It should be noted that in this embodiment, a low voltage $V_L$ is applied to the three electrodes 45, 46 and 47, but as long as the purpose of applying the low voltage $V_L$ is achieved, which is to form barriers avoiding unnecessary mixing of signal charges, it is also possible to apply a low voltage $V_L$ only to one or two of these electrodes.

Subsequently, preparations for reading out the next signal charges are performed in the times $t_3$–$t_5$. In the time t5, the signal 1 charge is held at the position where it has been read out (in the vertical transfer region below the electrode 43 to which an intermediate potential $V_M$ is applied), and a low voltage $V_L$ is applied to the electrodes 42 and 44, so as to prevent the signal charge from leaking.

Thus, with the read out signal charge 1 held in its place without being transferred, a signal charge 2 is read out from another photodiode at the time $t_6$. Also in this case, a high voltage $V_H$ is applied to the electrode 46 reading out the signal charge, and an intermediate voltage $V_M$ is applied to the electrodes 45 and 47 adjacent to this electrode 46. At this time, a low voltage $V_L$ instead of an intermediate voltage $V_M$ is applied to the electrode 44, so that unnecessary mixing of the signal charges 1 and 2 can be avoided.

Thus, at the times $t_8$–$t_{10}$, the signal charges 1 and 2 read out individually are transferred vertically and then horizontally without mixing with each other.

Fourth Embodiment

The present invention also can be applied to solid state imaging devices having four gates (so-called four-gate devices) or more. This embodiment relates to a method for driving a four-gate solid state imaging device.

Figure 23:
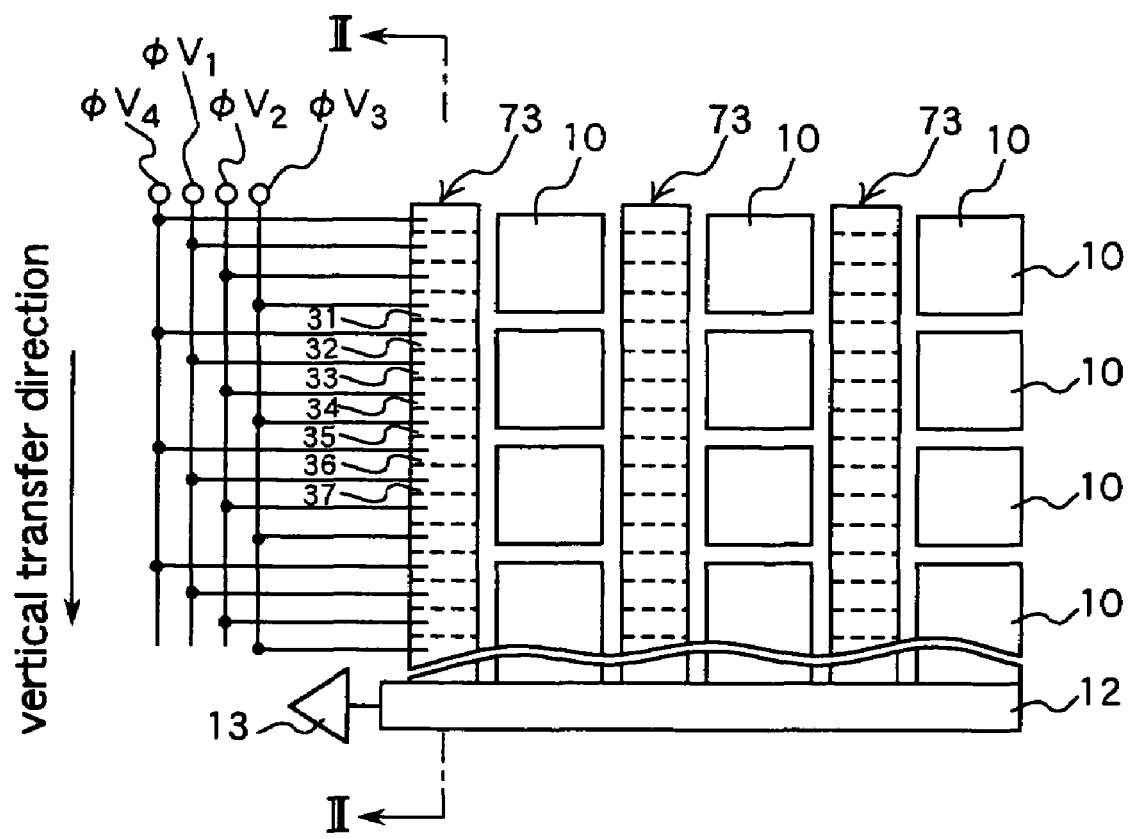
FIG. 23 is a top view of an embodiment of a solid state imaging device (so-called four-gate solid state imaging device), to which a driving method of the present invention can be applied.
Figure 24:
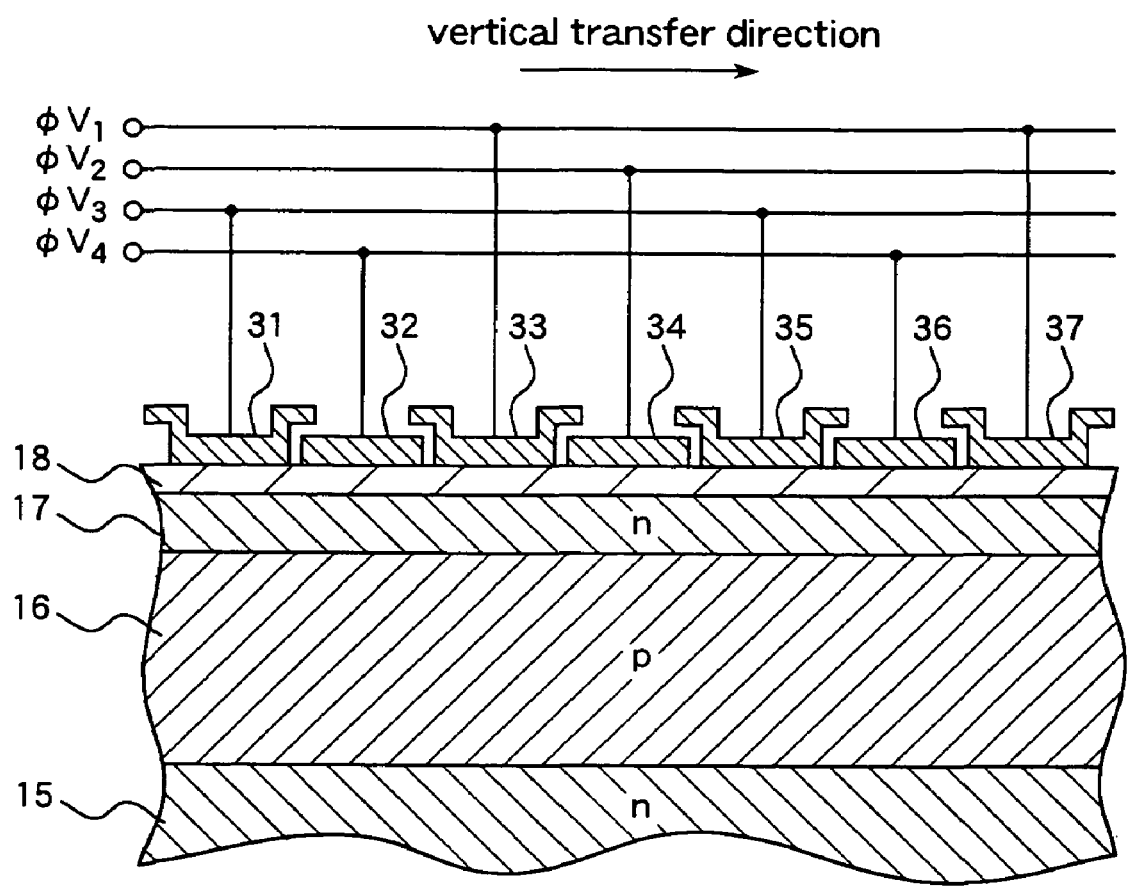
FIG. 24 shows a partial cross-section of the solid state imaging device in FIG. 23, taken along III—III.

The solid state imaging device used in this embodiment is shown in FIG. 23 and FIG. 24 (which is a partial cross-section taken along III—III in FIG. 23). This solid state imaging device is similar to the solid state imaging devices explained for the above embodiments (obviating its further explanation), except that four electrodes are provided for each light-receiving portion, and four types of wires are connected to the electrodes 31, 32 . . . 37 . . . , which allows four-phase driving.

Figure 25:
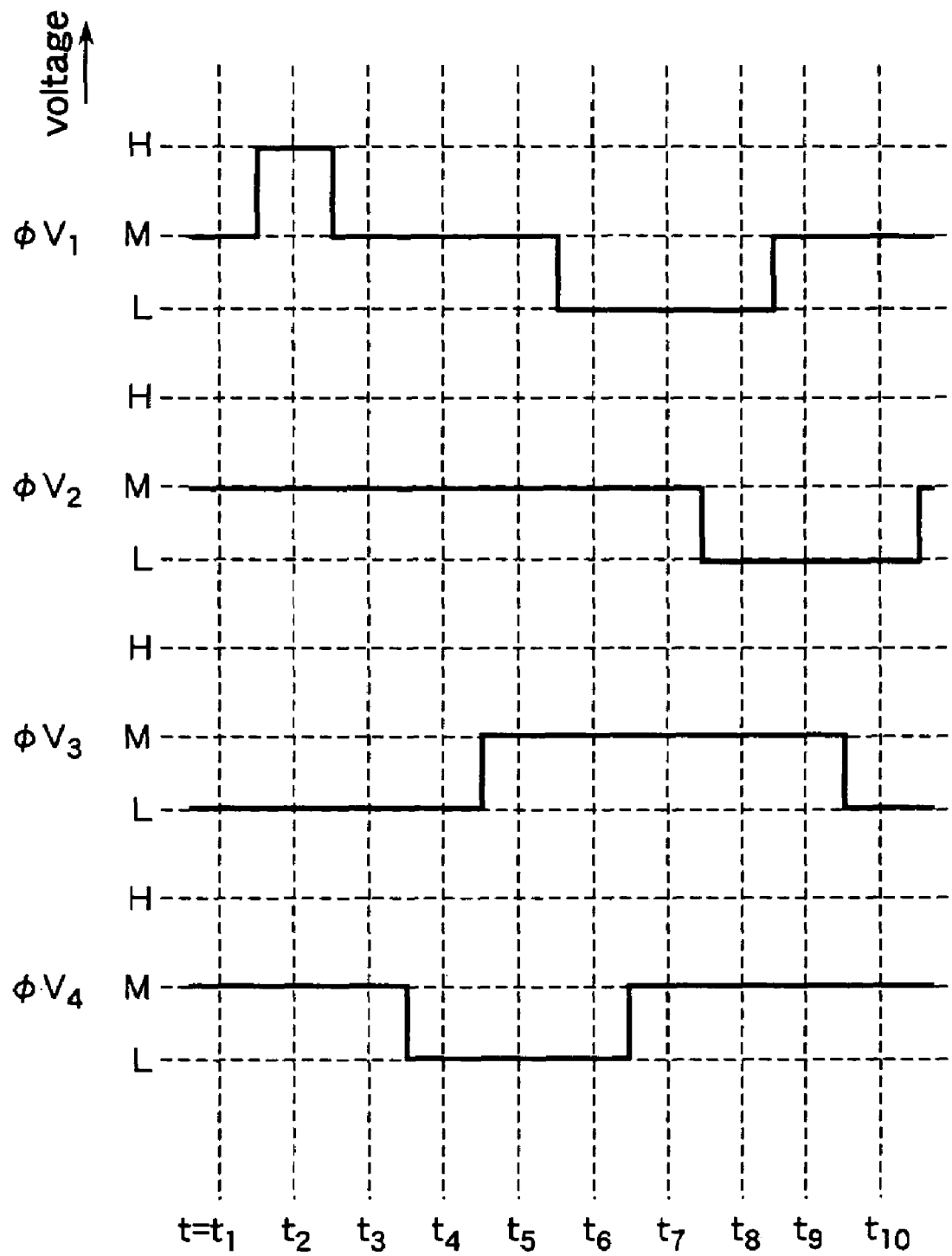
FIG. 25 shows an embodiment for the voltage patterns applied to the vertical transfer electrodes, so as to drive the solid state imaging device shown in FIGS. 23 and 24.
Figure 26:
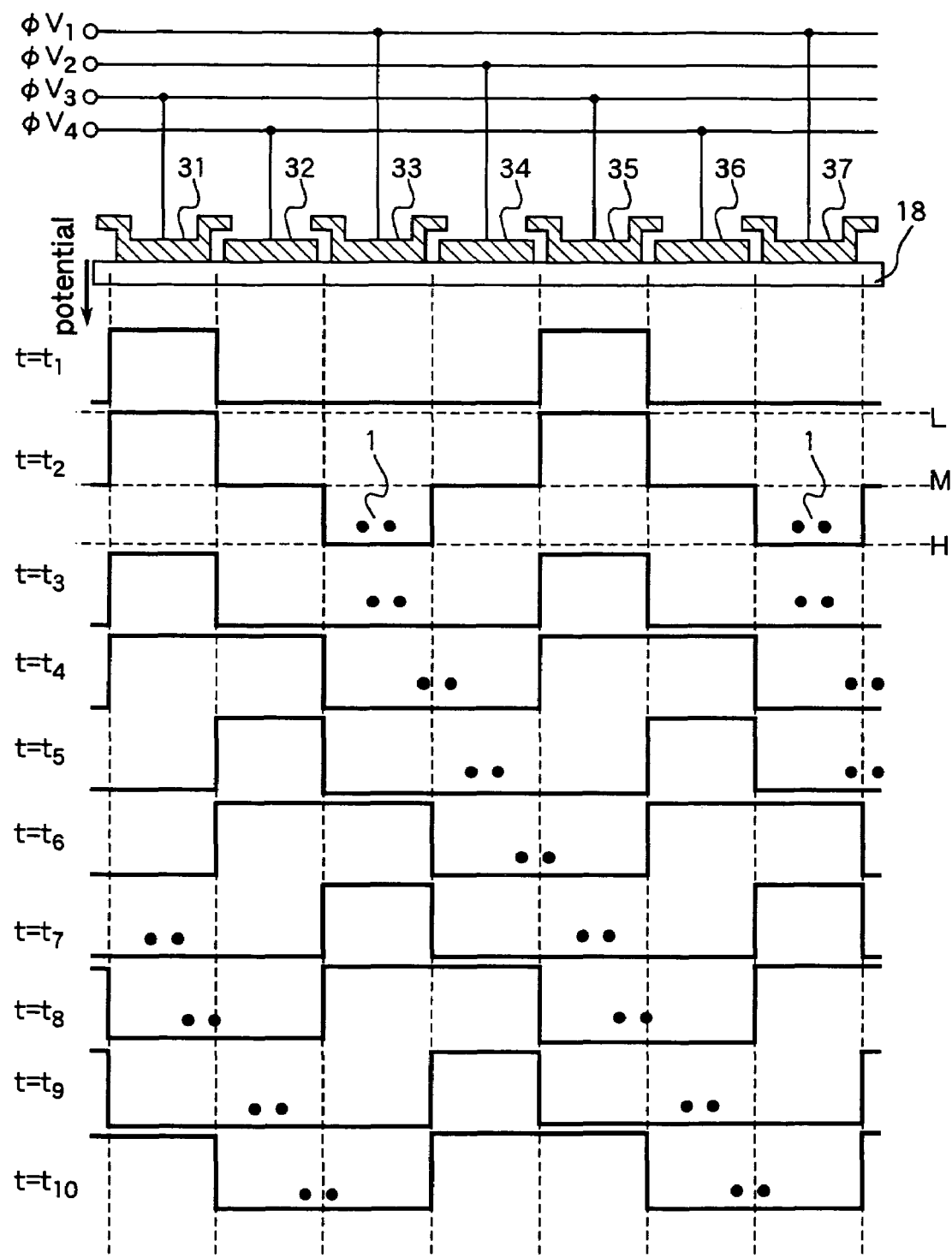
FIG. 26 shows the change of the potential that the application of the voltage patterns in FIG. 25 causes in the vertical transfer region of the solid state imaging device.

Referring to FIGS. 25 and 26, the following is an explanation of a method for driving this solid state imaging device. FIG. 25 shows the voltage patterns $\phi V_1$–$\phi V_4$ applied to the vertical transfer electrodes 73. Here too, the voltage patterns $\phi V_1$–$\phi V_4$ are achieved by holding voltages selected from a high voltage $V_H$, a medium voltage $V_M$ and a low voltage $V_L$ for certain periods of time. Applying such voltage pattern, the vertical transfer region 17 is subjected to a potential change whose passage over time ($t_1$–$t_{10}$) is shown in FIG. 26.

At the time $t_2$, $\phi V_1$ is held at the high voltage $V_H$ for reading. A voltage pulse extending before and after the time $t_2$ when the $\phi V_1$ peaks to $V_H$ is applied to the electrodes 33 and 37, and the signal charge 1 accumulated by the photodiode 10 corresponding to these electrodes is read out into the vertical transfer region 17.

With a four-gate (or more) solid state imaging device, it is not necessary to "cull out" the photodiodes in the vertical transfer direction as in the afore-going embodiments, and it is possible to read out signal charges 1 from all photodiodes arranged in the vertical transfer direction with a single read-out operation.

Also in this embodiment, at the time $t_2$, the voltage patterns $\phi V_2$ and $\phi V_4$ are held at an intermediate voltage $V_M$, so that the potential drop in the vertical transfer region below the electrodes 32, 34 and 36 adjacent to the electrodes 33 and 37 reading out the signal charge 1 is relaxed. Moreover, at the time $t_2$, $\phi V_3$ is held at the low voltage $V_L$, so that the potential of the vertical transfer region below the electrodes 31 and 35 drops to a level that avoids unnecessary mixing of signal charges.

From the time $t_3$ onward, the signal charges 1 are independently transferred vertically without mixing. In this embodiment, it is not necessary to perform the operation for reading out the signal charge from the photodiodes more than once for the same field.

In each of the afore-mentioned embodiments, the electric field applied to the silicon substrate during the read-out of the signal charge can be lowered, so that the generation of noise and drops in transfer efficiency accompanying the avalanche breakdown of silicon can be prevented.

It is preferable to use the embodiments of the present invention and embodiments obvious therefrom as appropriate, depending on the application for the solid state imaging device.

For example, in the fourth embodiment using the so-called four-gate solid state imaging device, the signal charges accumulated in all photodiodes can be read out in one read-out operation, so that it is appropriate for shortening the time lag until the image information is displayed. On the other hand, the embodiments using a two-gate solid state imaging device are advantageous considering the saturation charge of the vertical transfer region. This is because in these embodiments, a typical example of which is shown in FIG. 8, it is possible to use vertical transfer regions whose length in the vertical transfer direction corresponds to that of one photodiode as accumulation regions during the transfer of the signal charge.

Of course, applying the driving method of the present invention, it becomes possible to improve the saturation characteristics of the solid state imaging device even without using a particular embodiment. This aspect is explained in the following with reference to the FIGS. 19–22.

Figure 27:
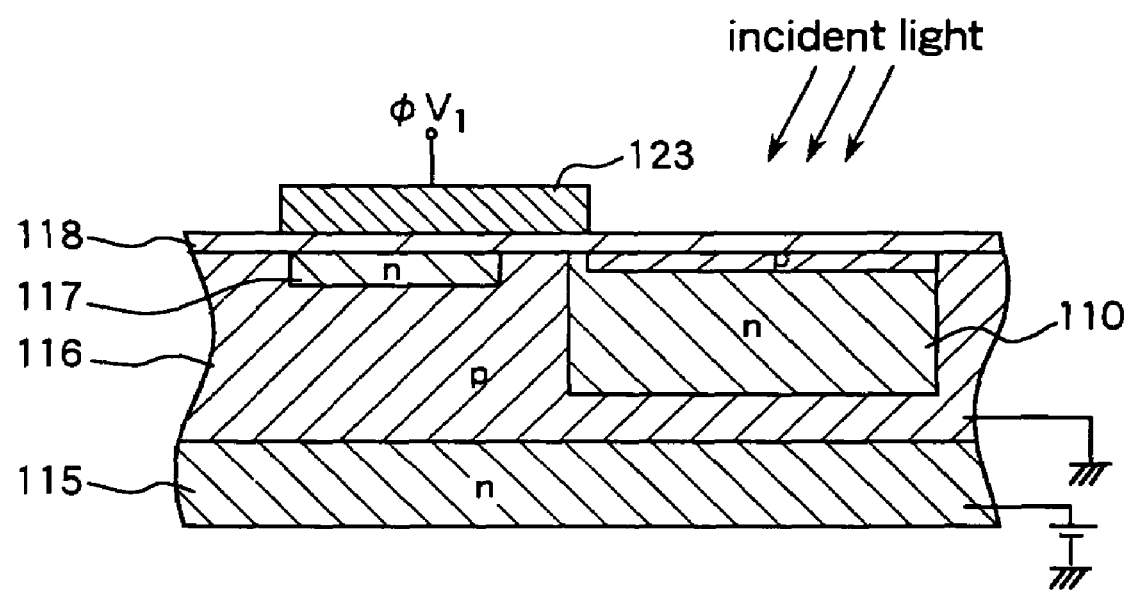
FIG. 27 shows a cross-section of a generic structure for a solid state imaging device, taken along the direction in which the signal charges are being read out.
Figure 31:
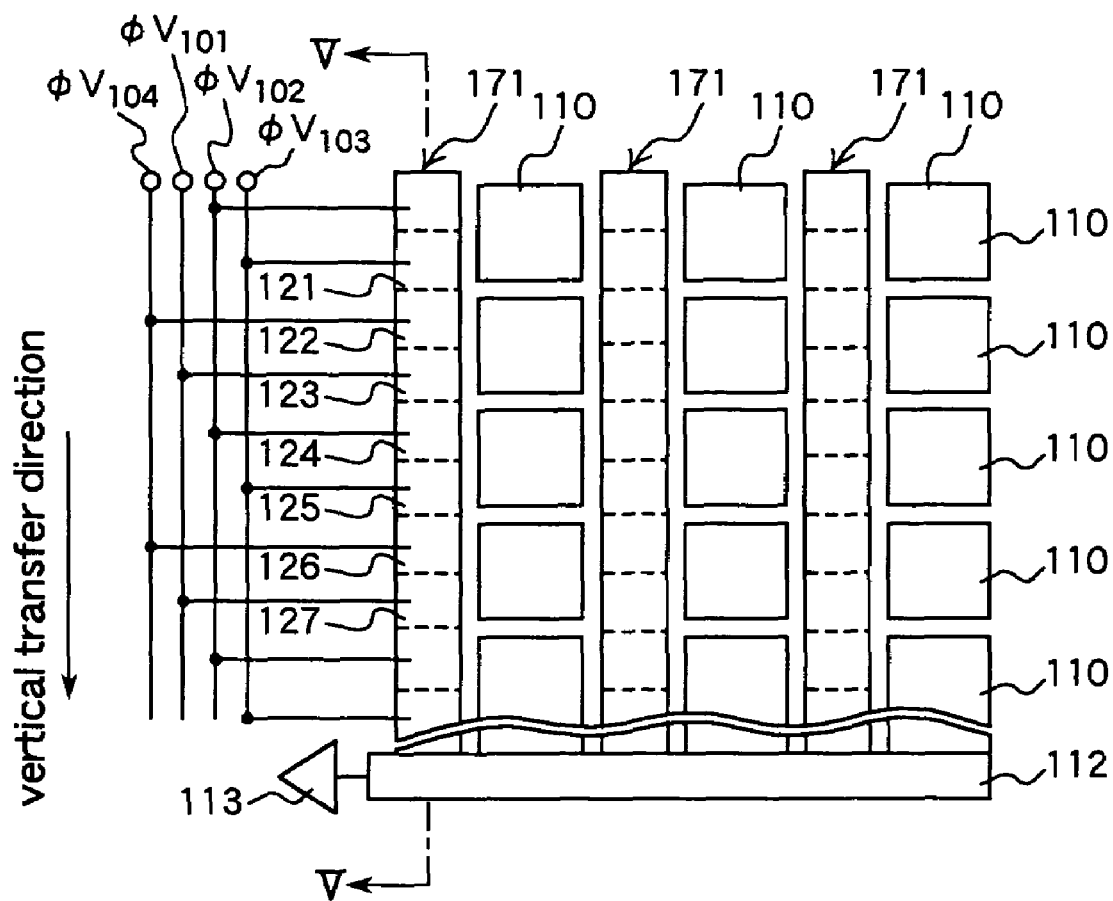
FIG. 31 is a plan view of a solid state imaging device, illustrating a conventional driving method.
Figure 32:
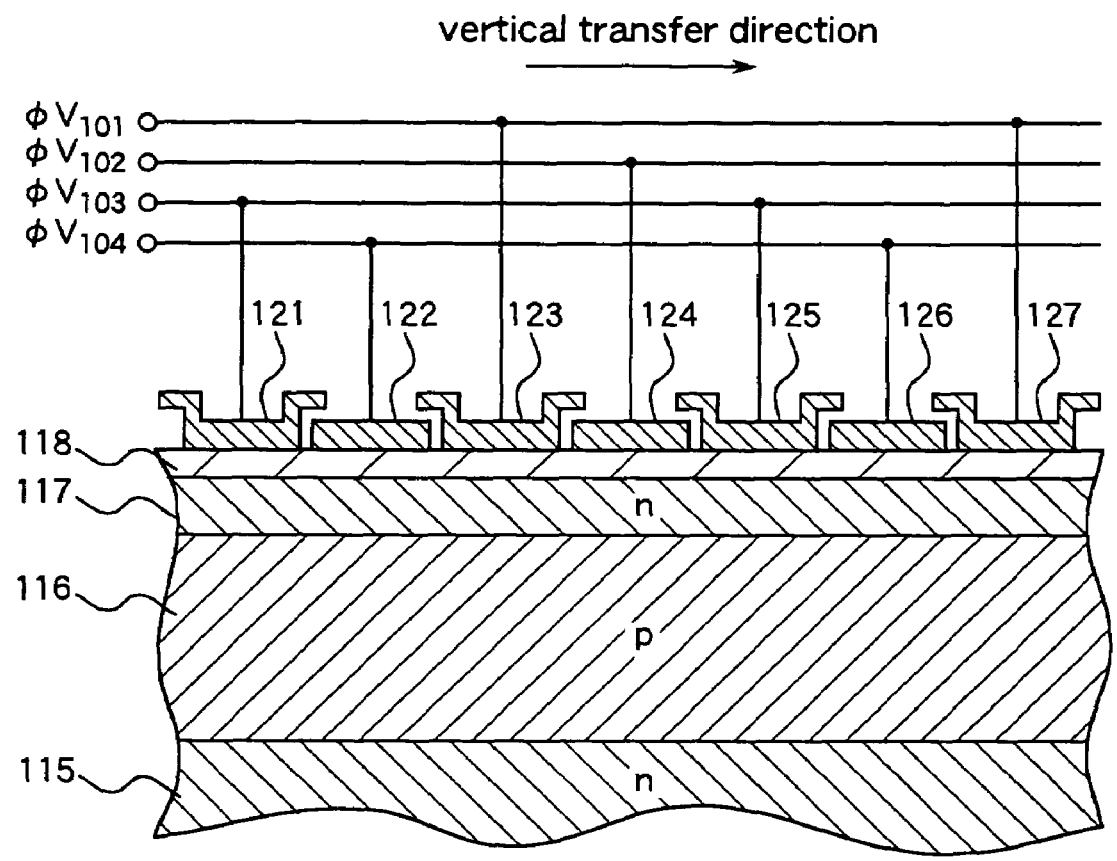
FIG. 32 is a partial cross-section of the solid state imaging device in FIG. 31, taken along V—V.
Figure 33:
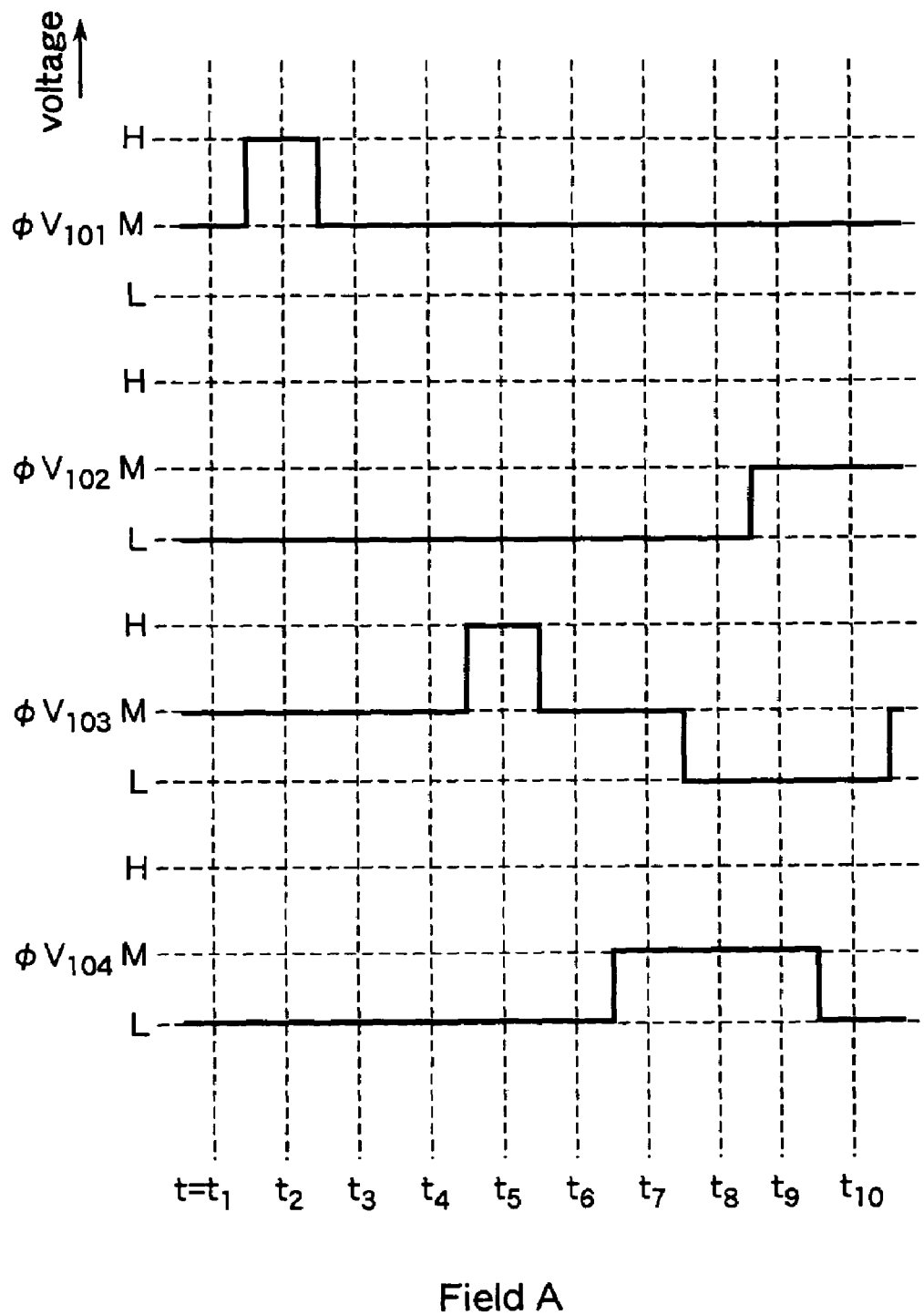
FIG. 33 shows a first field (Field A) for conventional voltage patterns applied to the vertical transfer electrodes, so as to drive the solid state imaging device shown in FIGS. 31 and 32.
Figure 34:
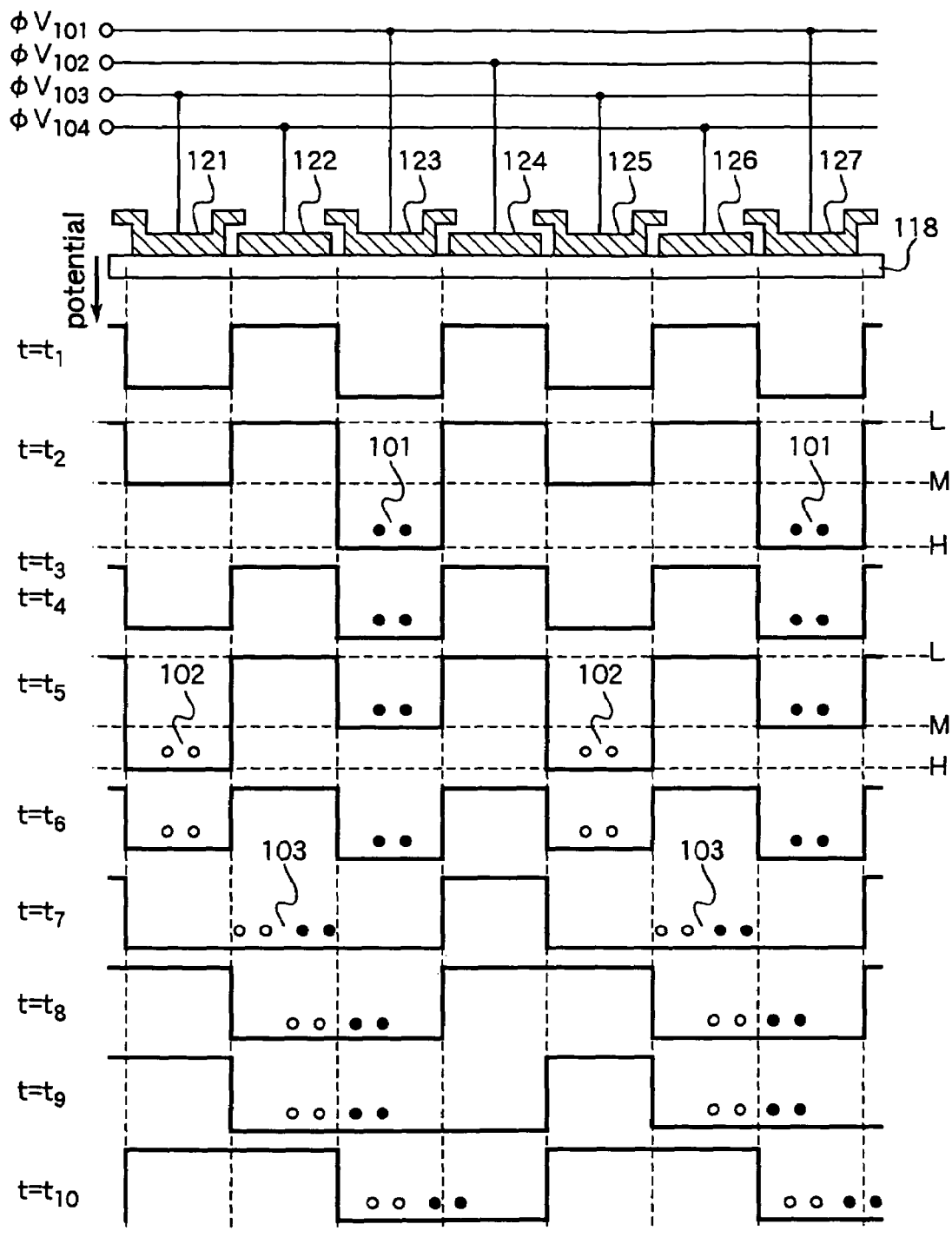
FIG. 34 shows the change of the potential that the application of the voltage patterns in FIG. 33 causes in the vertical transfer region of the solid state imaging device.

Limitations of the saturation charge of the vertical transfer region due to making the solid state imaging device smaller and its structures finer used to lead to a read-out residue of the signal charge, particularly when a large amount of signal charge was accumulated in the photodiode. That is to say, near the signal charge read-out portion (see FIG. 27) of the solid state imaging device in FIG. 31, a signal charge accumulated in the photodiode 110 due to incident light is read out to the vertical transfer region 117 with the electrode 123.

Figure 28A:
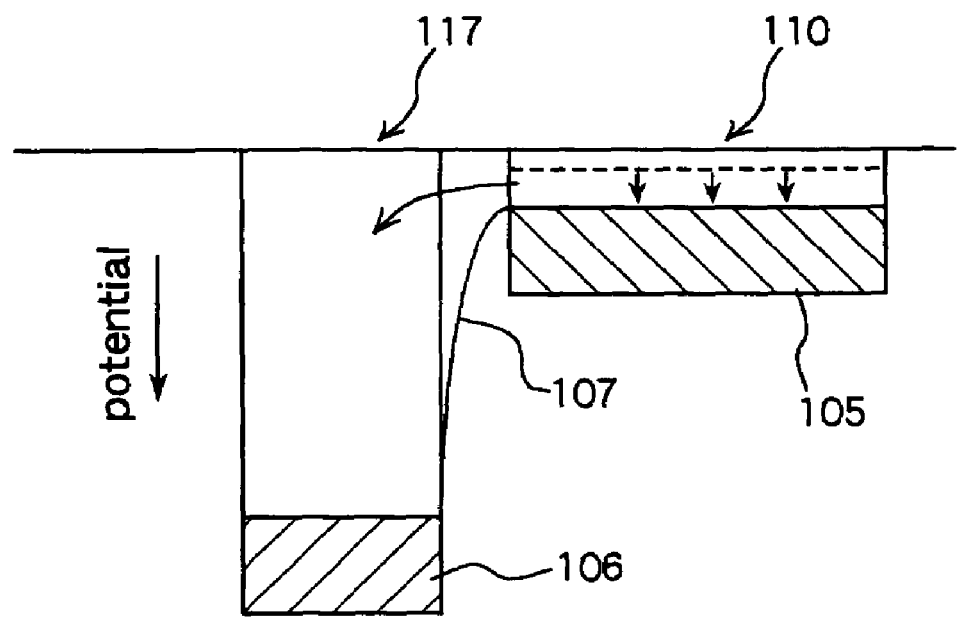
FIGS. 28A and B are drawings illustrating the read-out residue of a signal charge in the solid state imaging device of FIG. 27.
Figure 28B:
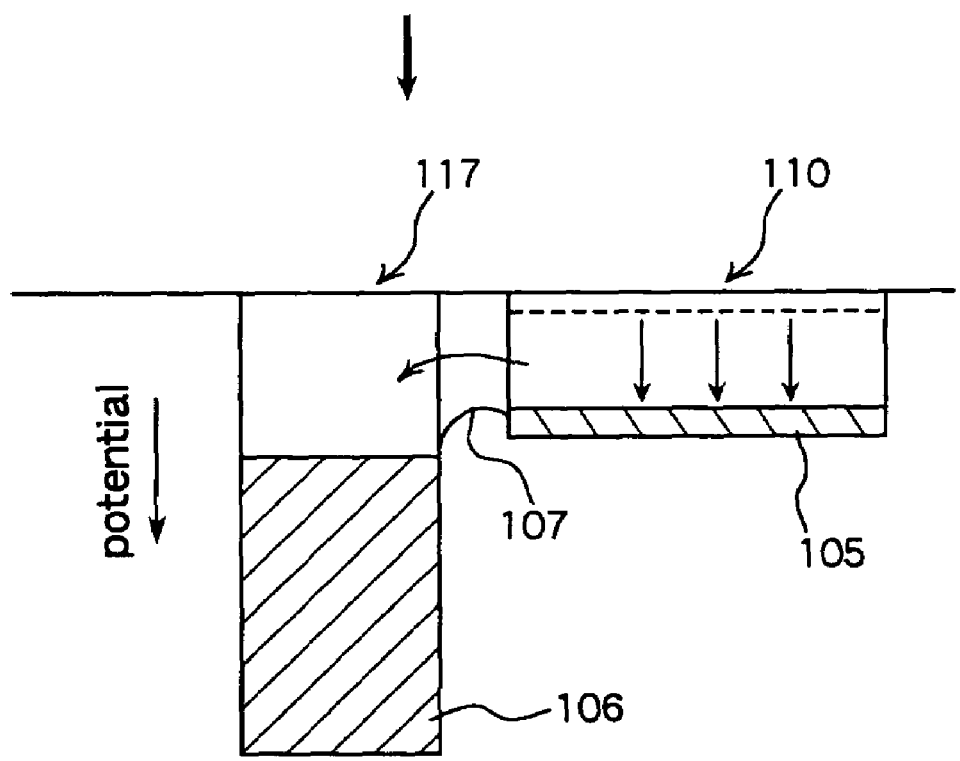

At this time, a high voltage $V_H$ for read-out is applied to the vertical transfer region 117, increasing its potential, so that the signal charge 105 moves from the photodiode 110 to the vertical transfer region 117, as shown in FIG. 28A. However, the area of the vertical transfer region 117 is limited, and what is more, when a large signal charge 105 builds up, the signal charge 106 that has been read out decreases the potential of the vertical transfer region to about the level of the photodiode 110 before the entire signal charge has been received, as shown in FIG. 28B. As a result, the slope of the potential 107 at the region between the photodiode 110 and the vertical transfer region 117 (that is, the so-called read-out control region) becomes almost horizontal, or a barrier is created by the read-out control region, and the signal charge 105 remains in the photodiode. Such a read-out residue of the signal charge (non-depletion) causes afterimages and deteriorates the image quality of the solid state imaging device.

Figure 29:
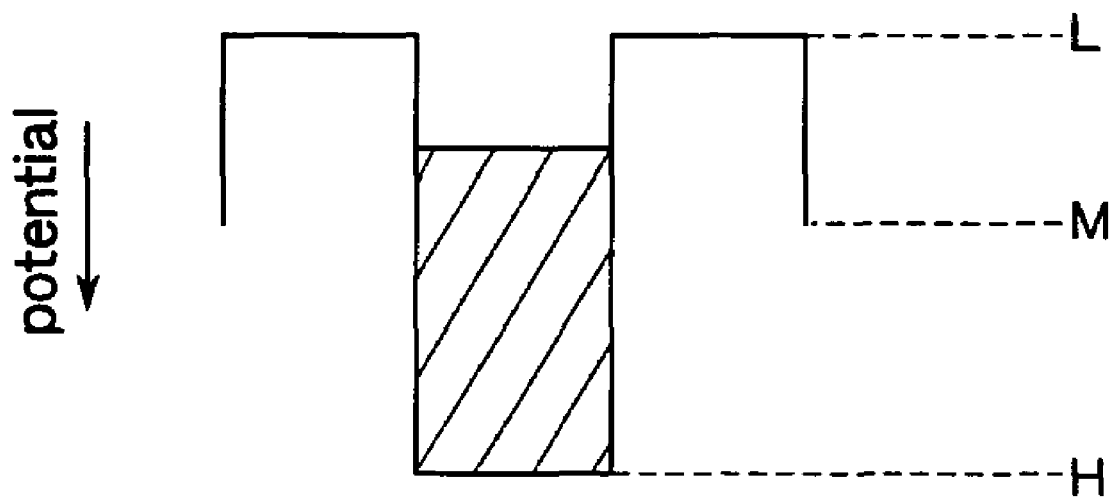
FIG. 29 is a drawing illustrating a potential change in the vertical transfer region that is brought about by reading out a signal charge with a conventional driving method.
Figure 30:
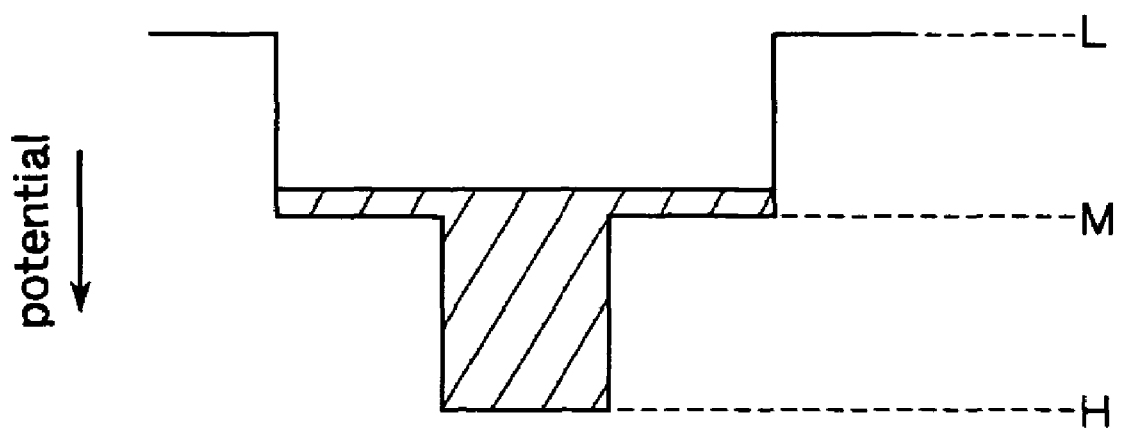
FIG. 30 is a drawing illustrating the potential change in the vertical transfer region that is brought about by reading out a signal charge with a driving method of the present invention.

In the present invention however, the saturation capacity of the vertical transfer region, that is, its ability to accept a signal charge, is larger than in the prior art, because an intermediate voltage $V_M$ is applied to the electrodes adjacent to those electrodes to which a high voltage $V_H$ for read-out is applied. In other words, as becomes apparent by comparing FIG. 29 with FIG. 30, applying the driving method of the present invention, an intermediate voltage $V_M$ is applied to the electrodes adjacent in the vertical transfer direction, so that the capacity for accepting a signal charge of the vertical transfer region 17 becomes larger than that of a vertical transfer region 117 in which a low voltage $V_L$ is applied to the adjacent electrodes as in the prior art, and potential drops due to the read out signal charges are relaxed.

Thus, with the driving method of the present invention, it is not only possible to reduce noise generated in the image information and increase the transfer efficiency for signal charges, but it is also possible to increase the capacity for accepting signal charges of the vertical transfer region, whose area is limited by miniaturization and finer structures.

The driving method of the present invention is especially advantageous for solid state imaging devices, in which the isolating film formed on the silicon substrate is thin. If the isolating film is a silicon oxide film, then the effect of the driving method of the present invention can be attained sufficiently, if the film thickness is not larger than 100 nm, preferably not more than 60 nm. If the isolating film is made of other materials, then the effect of the present invention can be attained similarly, if, converting the film into a silicon oxide film, its thickness is not larger than 100 nm, so that, depending on the ratio between the dielectric constant of these materials and the dielectric constant of the silicon oxide, the dielectric effect in the direction of the film thickness becomes equivalent to that of the silicon oxide film in the present invention.

If the insulating film includes more than one layer, then the approach of converting it into a single-layered silicon oxide film and applying the aforementioned evaluation can be performed just the same. For example, a two-layer insulating film in which a 20 nm thick silicon nitride film has been formed on a 50 nm thick silicon oxide film is, with regard to its dielectric effect in the film thickness direction, equivalent to a 60 nm silicon oxide film. Using such a two-layered structure of silicon oxide and silicon nitride, it becomes possible to improve the sensitivity by preventing reflections at the top of the photodiodes.

In the afore-mentioned embodiments of the present invention, electrodes formed as vertical transfer electrodes were used as the read-out electrodes for reading out signal charges. However, the present invention is not limited to this, and can be applied also to solid state imaging devices in which the read-out electrodes are provided independently. Moreover, the present invention is not limited to so-called area sensors having vertical transfer regions and horizontal transfer regions, but can be applied to linear sensors as well.

As has been explained in detail above, the present invention makes it possible to prevent the generation of white marks and the deterioration of the transfer efficiency of signal charges in solid state imaging devices that have been made smaller and which have an increased number of pixels. Moreover, in addition to achieving lower driving voltages, the present invention makes it possible to prevent read-out residues of the signal charges occurring when the device is made smaller and its number of pixels is increased.

The driving methods of the present invention in principle also can be applied to conventional solid state imaging devices without preparing another power source or the like, by changing the voltage patterns applied to the vertical transfer electrodes with a controller. How to design the voltage patterns that are applied by the controller in accordance with the idea of signal charge transfer is well-known in the art, so that the present invention easily can be carried out in accordance with the number of gates of the solid state imaging device by the person skilled in the art upon reference to the above-described embodiments serving as examples, the foregoing description and the accompanying drawings. In consideration of the current pace of development making solid state imaging devices smaller and increasing their number of pixels, the industrial applicability and advantages of the present invention are deemed to be extremely significant.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, and all changes that come within the meaning and range of equivalency of the claims are intended to be embraced therein.

What is claimed is:

1. A method for driving a solid state imaging device comprising a plurality of light-receiving portions formed in a semiconductor substrate, a transfer region formed alongside a column of said light-receiving portions in said semiconductor substrate, and transfer electrodes made of a plurality of electrodes arranged on said transfer region, the method comprising reading out signal charges accumulated in said light-receiving portions from said light-receiving portions to said transfer region; and transferring the signal charges in the transfer region while applying voltage to said plurality of electrodes; and
at a time when the signal charges are being read out to said transfer region,
(i) applying a read-out voltage $V_H$ to the electrodes corresponding to those light-receiving portions that include signal charges to be read out;
(ii) applying a barrier voltage $V_L$ that is lower than the read-out voltage $V_H$ to at least one of said electrodes, which is located between the electrodes to which the read-out voltage $V_H$ is being applied and which is not adjacent to the electrodes to which the read-out voltage $V_H$ is being applied; and
(iii) applying an intermediate voltage $V_M$ that is lower than the read-out voltage $V_H$ and higher than the barrier voltage $V_L$ to those electrodes that are adjacent to the electrodes to which the read-out voltage $V_H$ is being applied;
wherein said plurality of light-receiving portions is arranged in rows and columns; said transfer region is composed of vertical transfer regions; a horizontal transfer region is connected to ends of said vertical transfer regions; said plurality of light-receiving portions includes a first group of light-receiving portions and a second group of light-receiving portions, and the first and second group of light-receiving portions are arranged alternately alongside each of said vertical transfer regions, and two electrodes correspond to each of said plurality of light-receiving portions;

the method further comprising:

driving a first field, including: transferring a first signal charge read out from those light-receiving portions that belong to said first group of light-receiving portions to the vertical transfer regions below the electrodes corresponding to those light-receiving portions that belong to said second group of light-receiving portions; reading out a second signal charge from those light-receiving portions that belong to said second group of light-receiving portions and mixing it with the first signal charge; and transferring the mixed signal charges in said vertical transfer regions to said horizontal transfer region; and driving a second field, including: transferring a second signal charge read out from those light-receiving portions that belong to said second group of light-receiving portions to the vertical transfer regions below the electrodes corresponding to those light-receiving portions that belong to said first group of light-receiving portions; reading out a first signal charge from those light-receiving portions that belong to said first group of light-receiving portions and mixing it with the second signal charge; and transferring the mixed signal charges in said vertical transfer regions to said horizontal transfer region.

2. A camera comprising:

a controller for applying a voltage pattern from a power source to the electrodes constituting the transfer electrodes, so as to carry out the driving method of claim 1; and a solid state imaging device including a plurality of light-receiving portions formed in a semiconductor substrate, a transfer region formed alongside a column of said light-receiving portions in said semiconductor substrate, and transfer electrodes made of a plurality of electrodes arranged on said transfer region.

3. The camera of claim 2, wherein the solid state imaging device further comprises an insulating film formed between said transfer region and said transfer electrodes, and the thickness of the insulating film when converted into a silicon oxide film so as to keep an equivalent dielectric effect in film thickness direction is not more than 100 nm.

4. A method for driving a solid state imaging device comprising a plurality of light-receiving portions formed in a semiconductor substrate, a transfer region formed alongside a column of said light-receiving portions in said semiconductor substrate, and transfer electrodes made of a plurality of electrodes arranged on said transfer region, the method comprising reading out signal charges accumulated in said light-receiving portions from said light-receiving portions to said transfer region; and transferring the signal charges in the transfer region while applying voltage to said plurality of electrodes; and at a time when the signal charges are being read out to said transfer region, (i) applying a read-out voltage $V_H$ to the electrodes corresponding to those light-receiving portions that include signal charges to be read out;

(ii) applying a barrier voltage $V_L$ that is lower than the read-out voltage $V_H$ to at least one of said electrodes, which is located between the electrodes to which the read-out voltage $V_H$ is being applied and which is not adjacent to the electrodes to which the read-out voltage $V_H$ is being applied; and (iii) applying an intermediate voltage $V_M$ that is lower than the read-out voltage $V_H$ and higher than the barrier voltage $V_L$ to those electrodes that are adjacent to the electrodes to which the read-out voltage $V_H$ is being applied, wherein said plurality of light-receiving portions includes a first group of light-receiving portions and a second group of light-receiving portions, the first and second group of light-receiving portions being arranged alternately alongside each of said vertical transfer regions; and three electrodes correspond to each of said plurality of light-receiving portions;

the method further comprising:

reading out a first signal charge from the light-receiving portions belonging to the first group of light-receiving portions; and reading out a second signal charge from the light-receiving portions belonging to the second group of light-receiving portions while applying a barrier voltage $V_L$ to the outer two of said three electrodes corresponding to the light-receiving portions belonging to the first group of light-receiving portions and applying an intermediate voltage $V_M$ to those middle electrodes located between said outer two electrodes so as to hold the first signal charge in the vertical transfer regions below the middle electrodes.

5. The method of claim 4, wherein signal charges that have been read out are transferred in said transfer region without being mixed with each other.

6. A method for driving a solid state imaging device comprising a plurality of light-receiving portions formed in a semiconductor substrate, a transfer region formed alongside a column of said light-receiving portions in said semiconductor substrate, and transfer electrodes made of a plurality of electrodes arranged on said transfer region, the method comprising reading out signal charges accumulated in said light-receiving portions from said light-receiving portions to said transfer region; and transferring the signal charges in the transfer region while applying voltage to said plurality of electrodes; and at a time when the signal charges are being read out to said transfer region, and lasting for a period starting at a predetermined period of time before the beginning of an application of a read-out voltage $V_H$ to the electrodes corresponding to those light-receiving portions that include signal charges to be read out and ending when the application of a read-out voltage $V_H$ is terminated, applying to those electrodes corresponding to the light-receiving portions that are adjacent to those light-receiving portions that include signal charges to be read out, a voltage change that is opposite to a voltage change occurring when the read-out voltage $V_H$ is applied;

wherein said plurality of light-receiving portions is arranged in rows and columns; said transfer region is composed of vertical transfer regions; a horizontal transfer region is connected to ends of said vertical transfer regions; said plurality of light-receiving portions includes a first group of light-receiving portions and a second group of light-receiving portions, and the first and second group of light-receiving portions are arranged alternately alongside each of said vertical transfer regions; and two electrodes correspond to each of said plurality of light-receiving portions;

wherein a first signal charge and a second signal charge are transferred separately to the horizontal transfer region by driving the first field, which transfers the first signal charge read out from those light-receiving portions that belong to said first group of light-receiving portions in the vertical transfer region to the horizontal transfer region; and by driving a second field, which transfers the second signal charge read out from those light-receiving portions that belong to said second group of light-receiving portions in the vertical transfer region to the horizontal transfer region.

7. A camera comprising:
a controller for applying a voltage pattern from a power source to the electrodes constituting the transfer electrodes, so as to carry out the driving method of claim 6; and
a solid state imaging device including a plurality of light-receiving portions formed in a semiconductor substrate, a transfer region formed alongside a column of said light-receiving portions in said semiconductor substrate, and transfer electrodes made of a plurality of electrodes arranged on said transfer region.

8. The camera of claim 7, wherein the solid state imaging device further comprises an insulating film formed between said transfer region and said transfer electrodes, and the thickness of the insulating film when converted into a silicon oxide film so as to keep an equivalent dielectric effect in film thickness direction is not more than 100 nm.

9. A method for driving a solid state imaging device comprising a plurality of light-receiving portions formed in a semiconductor substrate, a transfer region formed alongside a column of said light-receiving portions in said semiconductor substrate, and transfer electrodes made of a plurality of electrodes arranged on said transfer region, the method comprising reading out signal charges accumulated in said light-receiving portions from said light-receiving portions to said transfer region; and transferring the signal charges in the transfer region while applying voltage to said plurality of electrodes; and
at a time when the signal charges are being read out to said transfer region,
and lasting for a period starting at a predetermined period of time before the beginning of an application of a read-out voltage $V_H$ to the electrodes corresponding to those light-receiving portions that include signal charges to be read out and ending when the application of a read-out voltage $V_H$ is terminated,
applying to those electrodes corresponding to the light-receiving portions that are adjacent to those light-receiving portions that include signal charges to be read out, a voltage change that is opposite to a voltage change occurring when the read-out voltage $V_H$ is applied; wherein said plurality of light-receiving portions includes a first group of light-receiving portions and a second group of light-receiving portions, the first and second group of light-receiving portions being arranged alternately alongside each of said vertical transfer regions; and three electrodes correspond to each of said plurality of light-receiving portions;
the method further comprising:
reading out a first signal charge from the light-receiving portions belonging to the first group of light-receiving portions; and
reading out a second signal charge from the light-receiving portions belonging to the second group of light-receiving portions while applying a barrier voltage $V_L$ to the outer two of said three electrodes corresponding to the light-receiving portions belonging to the first group of light-receiving portions and applying an intermediate voltage $V_M$ to those middle electrodes located between said outer two electrodes so as to hold the first signal charge in the vertical transfer regions below the middle electrodes.

10. The method of claim 9, wherein signal charges that have been read out are transferred in said transfer region without being mixed with each other.

11. A camera comprising:
a controller for applying a voltage pattern from a power source to the electrodes constituting the transfer electrodes, so as to carry out the driving method of claim 10; and
a solid state imaging device including a plurality of light-receiving portions formed in a semiconductor substrate, a transfer region formed alongside a column of said light-receiving portions in said semiconductor substrate, and transfer electrodes made of a plurality of electrodes arranged on said transfer region.

12. The camera of claim 11, wherein the solid state imaging device further comprises an insulating film formed between said transfer region and said transfer electrodes, and the thickness of the insulating film when converted into a silicon oxide film so as to keep an equivalent dielectric effect in film thickness direction is not more than 100 nm.

13. The camera of claim 12, wherein the solid state imaging device further comprises an insulating film formed between said transfer region and said transfer electrodes, and the thickness of the insulating film when converted into a silicon oxide film so as to keep an equivalent dielectric effect in film thickness direction is not more than 100 nm.

14. The camera of claim 11, wherein the solid state imaging device further comprises an insulating film formed between said transfer region and said transfer electrodes, and the thickness of the insulating film when converted into a silicon oxide film so as to keep an equivalent dielectric effect in film thickness direction is not more than 100 nm.

15. A camera comprising:
a controller for applying a voltage pattern from a power source to the electrodes constituting the transfer electrodes, so as to carry out the driving method of claim 9; and
a solid state imaging device including a plurality of light-receiving portions formed in a semiconductor substrate, a transfer region formed alongside a column of said light-receiving portions in said semiconductor substrate, and transfer electrodes made of a plurality of electrodes arranged on said transfer region.

16. The camera of claim 15, wherein the solid state imaging device further comprises an insulating film formed between said transfer region and said transfer electrodes, and the thickness of the insulating film when converted into a silicon oxide film so as to keep an equivalent dielectric effect in film thickness direction is not more than 100 nm.

17. The camera of claim 16, wherein the solid state imaging device further comprises an insulating film formed between said transfer region and said transfer electrodes, and the thickness of the insulating film when converted into a silicon oxide film so as to keep an equivalent dielectric effect in film thickness direction is not more than 100 nm.

18. The camera of claim 15, wherein the solid state imaging device further comprises an insulating film formed between said transfer region and said transfer electrodes, and the thickness of the insulating film when converted into a silicon oxide film so as to keep an equivalent dielectric effect in film thickness direction is not more than 100 nm.

19. A method for driving a solid state imaging device comprising a plurality of light-receiving portions formed in a semiconductor substrate, a transfer region formed alongside a column of said light-receiving portions in said semiconductor substrate, and transfer electrodes made of a plurality of electrodes arranged on said transfer region, the method comprising reading out signal charges accumulated in said light-receiving portions from said light-receiving portions to said transfer region; and transferring the signal charges in the transfer region while applying voltage to said plurality of electrodes; and
   at a time when the signal charges are being read out to said transfer region,
   and lasting for a period starting at a predetermined period of time before the beginning of an application of a read-out voltage $V_H$ to the electrodes corresponding to those light-receiving portions that include signal charges to be read out and ending when the application of a read-out voltage $V_H$ is terminated,
   applying, to those electrodes to which the read-out voltage $V_H$ is not applied and which are not adjacent to the electrodes to which the read-out voltage $V_H$ is applied, a voltage change that is opposite to a voltage change occurring when the read-out voltage $V_H$ is applied;
wherein said plurality of light-receiving portions is arranged in rows and columns; said transfer region is composed of vertical transfer regions; a horizontal transfer region is connected to ends of said vertical transfer regions; said plurality of light-receiving portions includes a first group of light-receiving portions and a second group of light-receiving portions, and the first and second group of light-receiving portions are arranged alternately alongside each of said vertical transfer regions; and two electrodes correspond to each of said plurality of light-receiving portions;
   wherein a first signal charge and a second signal charge are transferred separately to the horizontal transfer region
   by driving a first field, which transfers the first signal charge read out from those light-receiving portions that belong to said first group of light-receiving portions in the vertical transfer region to the horizontal transfer region; and
   by driving a second field, which transfers the second signal charge read out from those light-receiving portions that belong to said second group of light-receiving portions in the vertical transfer region to the horizontal transfer region.

20. A camera comprising:
   a controller for applying a voltage pattern from a power source to the electrodes constituting the transfer electrodes, so as to carry out the driving method of claim 19; and
   a solid state imaging device including a plurality of light-receiving portions formed in a semiconductor substrate, a transfer region formed alongside a column of said light-receiving portions in said semiconductor substrate, and transfer electrodes made of a plurality of electrodes arranged on said transfer region.

21. The camera of claim 20, wherein the solid state imaging device further comprises an insulating film formed between said transfer region and said transfer electrodes, and the thickness of the insulating film when converted into a silicon oxide film so as to keep an equivalent dielectric effect in film thickness direction is not more than 100 nm.

22. A method for driving a solid state imaging device comprising a plurality of light-receiving portions formed in a semiconductor substrate, a transfer region formed alongside a column of said light-receiving portions in said semiconductor substrate, and transfer electrodes made of a plurality of electrodes arranged on said transfer region, the method comprising reading out signal charges accumulated in said light-receiving portions from said light-receiving portions to said transfer region; and transferring the signal charges in the transfer region while applying voltage to said plurality of electrodes; and
   at a time when the signal charges are being read out to said transfer region,
   and lasting for a period stating at a predetermined period of time before the beginning of an application of a read-out voltage $V_H$ to the electrodes corresponding to those light-receiving portions that include signal charges to be read out and ending when the application of a read-out voltage $V_H$ is terminated,
   applying, to those electrodes to which the readout voltage $V_H$ is not applied and which are not adjacent to the electrodes to which the read-out voltage $V_H$ is applied, a voltage change that is opposite to a voltage change occurring when the read-out voltage $V_H$ is applied;
wherein said plurality of light-receiving portions includes a first group of light-receiving portions and a second group of light-receiving portions, the first and second group of light-receiving portions being arranged alternately alongside each of said vertical transfer regions; and three electrodes correspond to each of said plurality of light-receiving portions;
   the method further comprising:
   reading out a first signal charge from the light-receiving portions belonging to the first group of light-receiving portions while applying a barrier voltage $V_L$ to the outer two of said three electrodes corresponding to the light-receiving portions belonging to the first group of light-receiving portions and applying an intermediate voltage $V_M$ to those middle electrodes located between said outer two electrodes so as to hold the first signal charge in the vertical transfer regions below the middle electrodes.

23. The method of claim 22, wherein signal charges that have been read out are transferred in said transfer region without being mixed with each other.

24. A camera comprising:
   a controller for applying a voltage pattern from a power source to the electrodes constituting the transfer electrodes, so as to carry out the driving method of claim 23; and
   a solid state imaging device including a plurality of light-receiving portions formed in a semiconductor substrate, a transfer region formed alongside a column of said light-receiving portions in said semiconductor substrate, and transfer electrodes made of a plurality of electrodes arranged on said transfer region.

25. The camera of claim 24, wherein the solid state imaging device further comprises an insulating film formed between said transfer region and said transfer electrodes, and the thickness of the insulating film when converted into a silicon oxide film so as to keep an equivalent dielectric effect in film thickness direction is not more than 100 nm.

26. A camera comprising:
   a controller for applying a voltage pattern from a power source to the electrodes constituting the transfer electrodes, so as to carry out the driving method of claim 22; and
   a solid state imaging device including a plurality of light-receiving portions formed in a semiconductor substrate, a transfer region formed alongside a column of said light-receiving portions in said semiconductor substrate, and transfer electrodes made of a plurality of electrodes arranged on said transfer region.

27. The camera of claim 26, wherein the solid state imaging device further comprises an insulating film formed between said transfer region and said transfer electrodes, and the thickness of the insulating film when converted into a silicon oxide film so as to keep an equivalent dielectric effect in film thickness direction is not more than 100 nm.

28. A solid state imaging device comprising a plurality of light-receiving portions formed in a semiconductor substrate; a transfer region formed in said semiconductor substrate alongside a column of said light-receiving portions; transfer electrodes arranged on said transfer region so that there are only three of the transfer electrodes corresponding to each of the light-receiving portions; and at least two sets of wires for separately connecting a first group of electrodes corresponding to a first group of light-receiving portions and a second group of electrodes corresponding to a second group of light-receiving portions, the first and second group of light-receiving portions being arranged alternately alongside said transfer region;

a first signal charge read out from those light-receiving portions that belong to said first group of light-receiving portions and a second signal charge read out from those light-receiving portions that belong to said second group of light-receiving portions are transferred independently;

wherein at a time when a read-out voltage is applied to read-out electrodes, an intermediate voltage that is lower than the read-out voltage is applied to both sides of the read-out electrodes, and a low voltage which is lower than the intermediate voltage is applied to at least one electrode among the electrodes located between the read-out electrodes and that are not adjacent to the read-out electrodes.

* * * * *